United States Patent
Pang et al.

(10) Patent No.: US 12,230,225 B2
(45) Date of Patent: *Feb. 18, 2025

(54) DISPLAY APPARATUS AND DISPLAY CONTROL METHOD

(71) Applicant: Hisense Visual Technology Co., Ltd., Shandong (CN)

(72) Inventors: Zhenhua Pang, Shandong (CN); Guangxue Liu, Shandong (CN); Yuxin Zhang, Shandong (CN); Caixia Zhao, Shandong (CN); Aichen Xu, Shandong (CN)

(73) Assignee: Hisense Visual Technology Co., Ltd., Shandong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/460,875

(22) Filed: Sep. 5, 2023

(65) Prior Publication Data

US 2023/0419916 A1 Dec. 28, 2023

Related U.S. Application Data

(63) Continuation of application No. 17/660,786, filed on Apr. 26, 2022, now Pat. No. 11,783,788, which is a (Continued)

(30) Foreign Application Priority Data

Mar. 18, 2020 (CN) .......................... 202010192086.8
Feb. 1, 2021 (CN) .......................... 202110137510.3
(Continued)

(51) Int. Cl.
*H05B 45/30* (2020.01)
*G09G 3/34* (2006.01)

(52) U.S. Cl.
CPC ....... *G09G 3/342* (2013.01); *G09G 2330/028* (2013.01)

(58) Field of Classification Search
CPC ............. G09G 3/342; G09G 2330/028; G09G 3/3406; H04N 5/63; H02M 3/33571;
(Continued)

(56) References Cited

U.S. PATENT DOCUMENTS 9,596,725 B2 * 3/2017 Hu ........................ H05B 45/375
9,743,468 B2 * 8/2017 Strijker ................. H02M 7/217
(Continued)

FOREIGN PATENT DOCUMENTS

CN 202058426 U 11/2011
CN 202102692 U 1/2012
(Continued)

OTHER PUBLICATIONS

International Search Report, mailed Jun. 2, 2021, for PCT/CN2021/080257 filed Mar. 11, 2021, 5 pages.
(Continued)

*Primary Examiner* — Olga V Merkoulova
(74) *Attorney, Agent, or Firm* — Workman Nydegger

(57) ABSTRACT

A display apparatus is disclosed. The display apparatus includes a display screen configured to display an image; at least one LED light bar configured to provide light to the display screen; and a power supply circuit configured to supply power to the display apparatus. The power supply circuit includes an LLC primary winding, a first secondary winding and a second LLC secondary winding, where the first LLC secondary winding is configured to convert a voltage of the LLC primary winding into a first voltage, the second LLC secondary winding is configured to convert the voltage of the LLC primary winding into a second voltage; and the power supply circuit is configured to adjust the first
(Continued)

voltage output from the first LLC secondary winding into a third voltage, and supply power to the at least one LED light bar through a sum of the third voltage and the second voltage.

14 Claims, 28 Drawing Sheets

Related U.S. Application Data continuation of application No. PCT/CN2021/080257, filed on Mar. 11, 2021.

(30) Foreign Application Priority Data

Feb. 1, 2021 (CN) .......................... 202110138504.X
Feb. 7, 2021 (CN) .......................... 202110177726.2

(58) Field of Classification Search
CPC ...... H02M 1/4225; H02M 3/335; H02M 3/01; H05B 45/34; H05B 45/30
See application file for complete search history.

(56) References Cited

U.S. PATENT DOCUMENTS

| | | | | |
|---|---|---|---|---|
| 9,961,728 | B2* | 5/2018 | Elferich | H02M 3/33507 |
| 9,991,791 | B2* | 6/2018 | Herfurth | H05B 45/375 |
| 10,483,850 | B1* | 11/2019 | Homsi | H02M 3/1584 |
| 10,848,064 | B2* | 11/2020 | Homsi | H02M 3/1584 |
| 11,263,959 | B2* | 3/2022 | Joo | G09G 3/32 |
| 2012/0250360 | A1* | 10/2012 | Orr | H02M 3/3376 |
| | | | | 363/21.02 |
| 2013/0009568 | A1* | 1/2013 | Yu | H02M 3/33561 |
| | | | | 315/297 |
| 2017/0288557 | A1* | 10/2017 | Fang | H02M 1/15 |

FOREIGN PATENT DOCUMENTS

| | | |
|---|---|---|
| CN | 102356368 A | 2/2012 |
| CN | 102523406 A | 6/2012 |
| CN | 102833912 A | 12/2012 |
| CN | 102917516 A | 2/2013 |
| CN | 202940727 U | 5/2013 |
| CN | 203675399 U | 6/2014 |
| CN | 105099202 A | 11/2015 |
| CN | 105895033 A | 8/2016 |
| CN | 106910475 A | 6/2017 |
| CN | 107454712 A | 12/2017 |
| CN | 107464533 A | 12/2017 |
| CN | 207070393 U | 3/2018 |
| CN | 107909969 A | 4/2018 |
| CN | 207251987 U | 4/2018 |
| CN | 108364613 A | 8/2018 |
| CN | 108665859 A | 10/2018 |
| CN | 208848603 U | 5/2019 |
| CN | 110048610 A | 7/2019 |
| CN | 209928945 U | 1/2020 |
| CN | 112004292 A | 11/2020 |
| EP | 2615887 A2 | 7/2013 |
| JP | 2006349745 A | 12/2006 |
| TW | 200738057 A | 10/2007 |

OTHER PUBLICATIONS

Chinese First Office Action, mailed Sep. 6, 2021, from Chinese Pat. App. No. 202110138504.X, 17 pages.

Chinese First Office Action, mailed Oct. 26, 2023, from Chinese patent app. no. 202110177726.2, 15 pages.

* cited by examiner

DISPLAY APPARATUS AND DISPLAY CONTROL METHOD

This application is a continuation application of U.S. patent application Ser. No. 17/660,786. The U.S. patent application Ser. No. 17/660,786 is a continuation application of International Application No. PCT/CN2021/080257, filed on Mar. 11, 2021, which claims priorities to Chinese Patent Application No. 202010192086.8 filed on Mar. 18, 2020, No. 202110137510.3 filed on Feb. 1, 2021, No. 202110138504.X filed on Feb. 1, 2021 and No. 202110177726.2 filed on Feb. 7, 2021, which are hereby incorporated by reference in their entireties.

FIELD

The disclosure relates to display technology, and particularly to a display apparatus and a display control method.

BACKGROUND

At present, with the development of electronic technologies, the integration level of electronic devices including display apparatuses such as televisions is getting higher and higher, which imposes higher and higher requirements on power supplies of the display apparatuses. At present, most of display apparatuses receive the AC power through plugs, then perform operations such as DC conversion and voltage transformation on the AC power by using special power supply circuits, and then supply power to loads in the display apparatuses.

The power supply circuit of stepped power supply has been disclosed in the related art. In some implementations, the voltage stress of the voltage adjustment module set for at least one LED light bar in the power supply circuit is relatively large, resulting in a large area of the Printed Circuit Board (PCB for short) where the power supply circuit is located occupied by the voltage adjustment module, and leading to high cost of the power supply circuit; in other implementations, since a plurality of LED drive components and the connected voltage adjustment module cannot be used in parallel, it is necessary to add windings or diodes in the LLC module to realize stepped power supply, which makes structure of the power supply circuit complicate.

SUMMARY

The disclosure provides a display apparatus, including: a display screen configured to display an image; at least one Light Emitting Diode (LED) light bar configured to provide light to the display screen; and a power supply circuit configured to supply power to the display apparatus.

The power supply circuit includes a resonant converter (LLC) primary winding, a first secondary winding and a second LLC secondary winding, where the first LLC secondary winding is configured to convert a voltage of the LLC primary winding into a first voltage, the second LLC secondary winding is configured to convert the voltage of the LLC primary winding into a second voltage; and the power supply circuit is configured to adjust the first voltage output from the first LLC secondary winding into a third voltage, and supply power to the at least one LED light bar through a sum of the third voltage and the second voltage.

In some embodiments, the at least one LED light bar includes a plurality of LED light bars; and the power supply circuit further includes: at least one voltage adjustment module and at least one voltage drive module; an output terminal of the second LLC secondary winding is coupled with an input terminal of the first LLC secondary winding, the input terminal and an output terminal of the first LLC secondary winding are respectively coupled with the at least one voltage adjustment module, and the at least one voltage adjustment module is coupled with the at least one voltage drive module; the first LLC secondary winding is configured to output the first voltage, and the second LLC secondary winding is configured to output the second voltage; the at least one voltage adjustment module is configured to adjust the first voltage into the third voltage, and send the sum of the third voltage and the second voltage to the at least one voltage drive module; the at least one voltage drive module is configured to supply power to the plurality of LED light bars respectively according to the sum of the third voltage and the second voltage.

In some embodiments, the at least one voltage drive module is further configured to send a feedback signal to the at least one voltage adjustment module according to currents of the plurality of LED light bars; the at least one voltage adjustment module is further configured to adjust the first voltage into the third voltage according to the feedback signal.

In some embodiments, the power supply circuit further includes an optocoupler, coupled with the at least one voltage drive module and the at least one voltage adjustment module respectively, and configured to perform opto-coupling isolation when the at least one voltage drive module sends the feedback signal to the at least one voltage adjustment module.

In some embodiments, the at least one LED light bar includes a plurality of LED light bars; and the power supply circuit further includes: at least one voltage adjustment module and at least one voltage drive module; an output terminal of the first LLC secondary winding is coupled with an input terminal of the second LLC secondary winding through the at least one voltage adjustment module, and an output terminal of the second LLC secondary winding is coupled with the at least one voltage drive module; the first LLC secondary winding is configured to output the first voltage, and the second LLC secondary winding is configured to output the second voltage; the at least one voltage adjustment module is configured to adjust the first voltage into the third voltage and send the third voltage to the second LLC secondary winding, and the second LLC secondary winding is configured to send the sum of the third voltage and the second voltage to the voltage drive module; the at least one voltage drive module is configured to supply power to the plurality of LED light bars respectively according to the sum of the third voltage and the second voltage.

In some embodiments, the power supply circuit further includes: a plurality of voltage adjustment modules; and a first LED light bar among the at least one LED light bar is coupled with a first voltage adjustment module among the plurality of voltage adjustment modules; an output terminal of the second LLC secondary winding is coupled with an input terminal of the first LLC secondary winding, an output terminal of the first LLC secondary winding is coupled with an input terminal of the first LED light bar among the at least one LED light bar respectively, an output terminal of the first LED light bar is coupled with an input terminal of the first voltage adjustment module, and an output terminal of the first voltage adjustment module is coupled with the input terminal of the first LLC secondary winding; the first voltage adjustment module among the plurality of voltage adjustment modules is configured to adjust the first voltage into a third voltage, and supply power to a LED light bar coupled with the first voltage adjustment module according to a sum of the third voltage and the second voltage.

In an embodiment of the disclosure, the power supply circuit further includes: a plurality of voltage adjustment modules; and the at least one LED light bar is respectively coupled with the second LLC secondary winding and a voltage adjustment module of the voltage adjustment modules; for each of the at least one LED light bar, an output terminal of the first LLC secondary winding is coupled with an output terminal of the voltage adjustment module, an input terminal of the second LLC secondary winding is coupled with an input terminal of the voltage adjustment module, and an output terminal of the second LLC secondary winding is coupled with an input terminal of the LED light bar; a first voltage adjustment module among the plurality of voltage adjustment modules is configured to adjust the first voltage into a third voltage, and supply power to a LED light bar coupled with the first voltage adjustment module according to a sum of the third voltage and the second voltage.

In some embodiments, an output voltage of the first LLC secondary winding is configured to supply power to a mainboard of the display apparatus.

In some embodiments, the first LLC secondary winding and the second LLC secondary winding are secondary windings of an LLC module in the power supply circuit; or the first LLC secondary winding and the second LLC secondary winding are secondary windings of a flyback voltage conversion module in the power supply circuit.

The disclosure further provides a power supply circuit, and the power supply circuit may be the power supply circuit in the display apparatus. For example, the power supply circuit may include: an LLC primary winding, a first resonant converter (LLC) secondary winding and a second LLC secondary winding, where the first LLC secondary winding is configured to convert a voltage of the LLC primary winding into a first voltage and then output the first voltage to the at least one LED light bar, and the second LLC secondary winding is configured to convert the voltage of the LLC primary winding into a second voltage and then output the second voltage to the at least one LED light bar; the power supply circuit is configured to adjust the first voltage output from the first LLC secondary winding into a third voltage, and supply power to the at least one LED lamp bar through a sum of the third voltage and the second voltage.

An embodiment of the disclosure further provide a display apparatus, including: a panel configured to display an image; a plurality of LED drive components, each of the LED drive components is configured to supply power to a plurality of connected Light Emitting Diode (LED) light bars, the LED light bars are configured to lighten the panel; and a power supply circuit configured to supply power to the plurality of LED drive components; where the power supply circuit is configured to generate a first voltage and a second voltage, and supply power to the plurality of LED drive components simultaneously through the first voltage and the second voltage.

In some embodiments, the power supply circuit is configured to provide a positive first voltage to positive electrodes of the plurality of LED drive components, and provide a negative second voltage to negative electrodes of the plurality of LED drive components.

In some embodiments, the power supply circuit includes: an LLC primary winding configured to receive an input voltage; a first LLC secondary winding, a positive electrode of the first LLC secondary winding is connected with positive electrodes of the plurality of LED drive components respectively and a negative electrode of the first LLC secondary winding is grounded; and the first LLC secondary winding is configured to convert the input voltage into a first voltage and then output the first voltage to the positive electrodes of the plurality of LED drive components; a second LLC secondary winding, a positive electrode of the second LLC secondary winding is grounded and a negative electrode of the second LLC secondary winding is connected with negative electrodes of the plurality of LED drive components respectively; and the second LLC secondary winding is configured to convert the input voltage into a second voltage and then output the second voltage to the negative electrodes of the plurality of LED drive components.

In some embodiments, the power supply circuit further includes: a plurality of voltage adjustment modules; where a positive electrode of each first LLC secondary winding is connected with a positive electrode of a LED drive component of the LED drive components through a voltage adjustment module of the voltage adjustment modules; the LED drive component is configured to send a feedback signal to the voltage adjustment module according to a working voltage of a plurality of connected LED light bars; and the voltage adjustment module is configured to adjust the first voltage output to the plurality of LED drive components according to the feedback signal.

In some embodiments, the power supply circuit further includes: a plurality of feedback circuits, where each LED drive component of the LED drive components is connected with the corresponding voltage adjustment module through a feedback circuit of the feedback circuits; the feedback circuit is configured to receive a first feedback signal output from the LED drive component, convert the first feedback signal into a second feedback signal, and output the second feedback signal to the voltage adjustment module; where the first feedback signal and the second feedback signal have different reference ground levels.

In some embodiments, the feedback circuit includes: a VI conversion circuit and a DC-DC voltage feedback circuit; the VI conversion circuit is configured to convert the first feedback signal in form of voltage signal into the second feedback signal in form of current signal and send the second feedback signal to the DC-DC voltage feedback circuit; the DC-DC voltage feedback circuit is configured to receive and send the second feedback signal to the voltage adjustment module.

In some embodiments, the feedback circuit includes: an LED voltage feedback circuit, an isolation circuit and a DC-DC voltage feedback circuit; the LED voltage feedback circuit is configured to generate a first intermediate signal according to the first voltage and the first feedback signal; the isolation circuit is configured to receive the first intermediate signal and generate an isolated second intermediate signal; the DC-DC voltage feedback circuit is configured to receive the second intermediate signal, generate a second feedback signal according to the second intermediate signal, and send the second feedback signal to the voltage adjustment module.

In some embodiments, the isolation circuit includes: a switch transistor; or an optocoupler.

In some embodiments, the DC-DC voltage feedback circuit further includes: a feedforward circuit configured to provide feedforward compensation; where a first terminal of the feedforward circuit is connected with an output terminal of the voltage adjustment module, and a second terminal of the feedforward circuit is connected with a feedback input terminal of the voltage adjustment module.

In some embodiments, the LED voltage feedback circuit further includes: a voltage regulator circuit, arranged between an output terminal of the voltage adjustment module and a reference voltage source, and configured to protect the reference voltage source.

The disclosure further provides a negative-voltage-stepped power supply circuit configured to supply power to a plurality of LED drive components, including: an LLC primary winding configured to receive an input voltage; a first LLC secondary winding, a positive electrode of the first LLC secondary winding is connected with positive electrodes of the plurality of LED drive components respectively and a negative electrode of the first LLC secondary winding is grounded; and the first LLC secondary winding is configured to convert the input voltage into a first voltage and then output the first voltage to the positive electrodes of the plurality of LED drive components; a second LLC secondary winding, a positive electrode of the second LLC secondary winding is grounded and a negative electrode of the second LLC secondary winding is connected with negative electrodes of the plurality of LED drive components respectively; and the second LLC secondary winding is configured to convert the input voltage into a second voltage and then output the second voltage to the negative electrodes of the plurality of LED drive components; a plurality of voltage adjustment modules, where the positive electrode of the first LLC secondary winding is connected with a positive electrode of a corresponding LED drive component of the LED drive components through a voltage adjustment module of the voltage adjustment modules; the LED drive component is configured to send a feedback signal to the voltage adjustment module according to a working voltage of a plurality of connected LED light bars; and the voltage adjustment module is configured to adjust the first voltage output to the plurality of LED drive components according to the feedback signal; a plurality of feedback circuits, where each of the LED drive components is connected with a corresponding voltage adjustment module of the voltage adjustment modules through a feedback circuit of the feedback circuits; the feedback circuit is configured to receive a first feedback signal output from the LED drive component, convert the first feedback signal into a second feedback signal, and output the second feedback signal to the voltage adjustment module; where the first feedback signal and the second feedback signal have different reference ground levels.

The disclosure provides a display apparatus, including: a backlight module and a panel; where the backlight module includes a plurality of power sources, a controller, and lamp areas corresponding to the plurality of power sources; the plurality of power sources are connected with the plurality of lamp areas through the controller; the plurality of power sources include two power sources, namely a first power source for providing a positive power supply signal to the controller and driving a lamp area and a second power source for driving a lamp area; the controller is configured to output a driving signal through negative voltage driving based on a control signal received and negative power supply signals and negative reference signals output from the plurality of power sources to drive a lamp area corresponding to a power source selected from the first power source and second power source to emit light, and then the lamp area provides backlight for the panel by transmitting the light to the panel; where the controller is configured to control the first power source to work and the second power source to turn off in a standby mode, and control the first power source and the second power source to work in a non-standby mode.

In some embodiments, a structure of the second power source is as follows: the second power source includes: a coil winding module and a first isolation voltage conversion module; the coil winding module is coupled to the first isolation voltage conversion module, and the coil winding module is connected with the lamp area through the controller; the first isolation voltage conversion module is configured to receive a power supply signal, and output a negative reference signal after voltage conversion; the coil winding module is configured to receive the power supply signal and the negative reference signal, and couple to obtain a negative power supply signal; where the negative power supply signal and the negative reference signal are used to be provided to the controller to generate the driving signal.

In some embodiments, a structure of the first power source is as follows: the first power source includes: a coil winding module, a second isolation voltage conversion module and a third isolation voltage conversion module; the second isolation voltage conversion module configured to receive a power supply signal, and an output terminal of the second isolation voltage conversion module is connected with the controller; the coil winding module is coupled to the second isolation voltage conversion module, and the coil winding module is connected with the lamp area through the controller; where the third isolation voltage conversion module is configured to receive the power supply signal; the second isolation voltage conversion module is configured to perform voltage conversion on the power supply signal to obtain a positive power supply signal and provide the positive power supply signal to the controller; the third isolation voltage conversion module is configured to perform voltage conversion on the power supply signal to obtain a negative reference signal; the coil winding module is configured to receive the power supply signal and the negative reference signal, and couple to obtain a negative power supply signal; where the negative power supply signal and the negative reference signal are used to be provided to the controller to generate the driving signal.

In some embodiments, another structure of the first power source is as follows: the first power source includes: a buck module, a first voltage conversion module and a second voltage conversion module; the first voltage conversion module is configured to receive a power supply signal, and an output terminal of the first voltage conversion module is connected with the controller; the second voltage conversion module is configured to receive the power supply signal; a first input terminal of the buck module is connected with the second voltage conversion module, a second input terminal of the buck module is grounded, and an output terminal of the buck module is connected with the lamp area through the controller; the first voltage conversion module is configured to perform voltage conversion on the power supply signal to obtain a positive power supply signal, the positive power supply signal is used to be provided to the controller; the second voltage conversion module is configured to perform voltage conversion on the power supply signal to obtain a negative reference signal; the buck module is configured to output a negative power supply signal based on the negative reference signal generated by the second voltage conversion module; where the negative power supply signal and the negative reference signal are used to be provided to the controller to generate the driving signal.

In some embodiments, another structure of the second power source is as follows: the second power source includes: a buck module and a third voltage conversion module; the third voltage conversion module receives a power supply signal; a first input terminal of the buck module is connected with the third voltage conversion module, a second input terminal of the buck module is grounded, and an output terminal of the buck module is connected with the lamp area through the controller; the third voltage conversion module is configured to perform voltage conversion on the power supply signal to obtain a negative reference signal; the buck module is configured to output a negative power supply signal based on the negative reference signal generated by the third voltage conversion module; where the negative power supply signal and the negative reference signal are used to be provided to the controller to generate the driving signal.

In some embodiments, the controller includes: a mainboard, a microprocessor, and a plurality of constant current drive modules; a first isolation module is connected between the mainboard and the microprocessor; the microprocessor is connected with the first power source and the plurality of constant current drive modules respectively; the plurality of power sources are connected with corresponding constant current drive modules; the plurality of constant current drive modules are connected with the plurality of lamp areas in one-to-one correspondence; the first isolation module is configured to perform level conversion on a control signal generated by the mainboard, and send a converted control signal to the microprocessor for analysis; each of the constant current drive modules is configured to receive a negative reference signal and a negative power supply signal, and generate and provide a driving signal to a corresponding lamp area according to a control signal parsed by the microprocessor, the negative reference signal and the negative power supply signal.

In some embodiments, the controller includes: a mainboard, a microprocessor connected with the mainboard, and a plurality of constant current drive modules; the apparatus further includes a plurality of second isolation modules that are in one-to-one correspondence with the plurality of constant current drive modules; the plurality of constant current drive modules are connected with the microprocessor through the corresponding second isolation modules; the microprocessor is grounded and configured to parse a control signal generated by the mainboard; each of the second isolation modules is configured to perform level conversion on the control signal parsed by the microprocessor, and send a converted control signal to a corresponding constant current drive module; each of the constant current drive modules is configured to receive a negative reference signal and a negative power supply signal, and generate and provide a driving signal to a corresponding lamp area according to the converted control signal, the negative reference signal and the negative power supply signal.

In some embodiments, the apparatus further includes a backplane; where high-level terminals of the plurality of lamp areas are all grounded through the backplane.

The disclosure provides a display control method, including: determining whether the display apparatus is currently in a standby mode; controlling a first power source to work and a second power source to turn off when the display apparatus is currently in the standby mode; controlling the first power source and the second power source to work when the display apparatus is currently in a non-standby mode.

In some embodiments, negative power supply signals and negative reference signals provided by the plurality of power sources match powers of light-emitting elements in corresponding lamp areas; and before determining whether the display apparatus is currently in the standby mode, the method further includes: dividing all light-emitting elements of the backlight module according to a rule that light-emitting elements with same power belong to a same lamp area, to obtain a plurality of lamp areas.

In the display apparatus in the disclosure, the backlight is configured for the panel by using the backlight module powered by a plurality of power sources, that is, the backlight module in the disclosure includes a plurality of power sources which correspond to different lamp areas respectively. Also, the plurality of power sources include: a first power source for providing a positive power supply signal to the controller and driving a lamp area, and a second power source for driving a lamp area. When the backlight module works, the controller in the backlight module is powered by the first power source among the plurality of power sources described above, and sends the driving signal to the lamp areas corresponding to the power sources according to the negative reference signals generated by different power sources and the power supply signals provided by the first power source and the second power source, so that the lamp areas emit light through negative voltage driving. In addition, the controller controls the first power source to work and the second power source to turn off in the standby mode; and both the first power source and the second power source are in the working state in the non-standby mode.

DETAILED DESCRIPTION OF EMBODIMENTS

At present, in order to facilitate people's access to information, the screens of various electronic products, such as mobile phones, computers and televisions, are getting larger and larger. However, as the panels of various display apparatuses become larger and larger, more light-emitting elements need to be added inside the electronic products correspondingly, and the driving signals are provided by a power source or a driving device to the light-emitting elements with the power required by the light-emitting elements, so that the light-emitting elements can provide enough light for the display screen, and the information required by the user can be clearly displayed on the panel.

As the demand for obtaining information is increasing, various types of display apparatuses have emerged, such as computers, televisions, projectors, etc. The power supply circuit is one of the most important circuit structures in the display apparatus, and the power supply circuit can provide the electric energy for the display apparatus, so that the display apparatus can operate normally. Some display apparatuses are provided with an independent power board, and some display apparatuses combine the power board and the mainboard into one.

Figure 1:
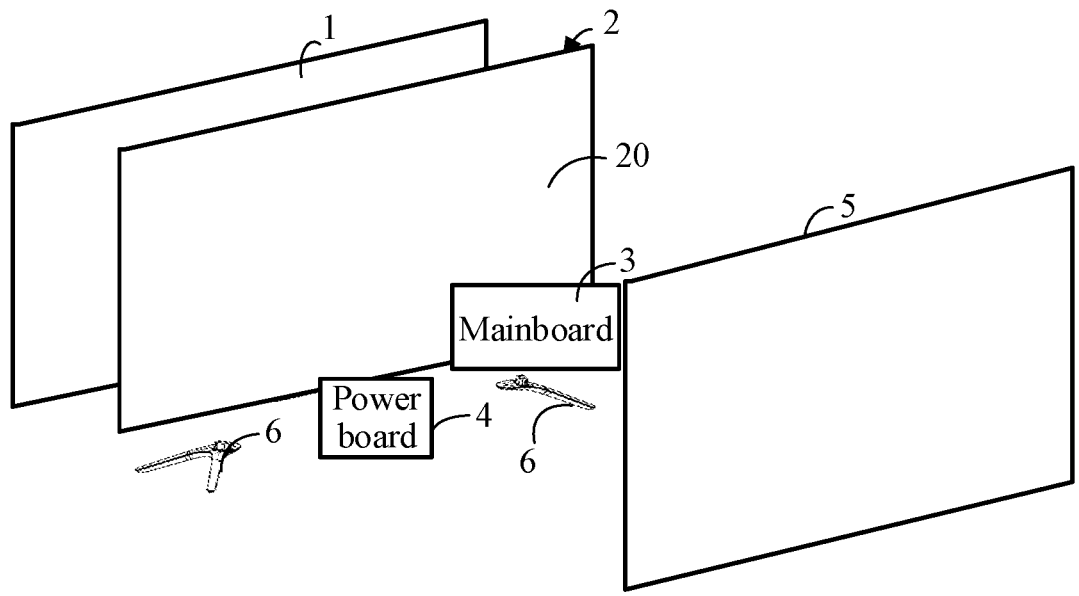
FIG. 1 is a structural schematic diagram of a display apparatus with an independent power board.

Taking a display apparatus with an independent power board as an example, the structure of the display apparatus will be described. Referring to FIG. 1, FIG. 1 is a structural schematic diagram of a display apparatus with an independent power board. As shown in FIG. 1, the display apparatus includes: a panel 1, a backlight assembly 2, a mainboard 3, a power board 4, a rear shell 5 and a base 6. The panel 1 is configured to present images to users; the backlight assembly 2 is located below the panel 1 and generally includes some optical components for supplying sufficient brightness and uniformly distributed light sources so that the panel 1 can display the images normally, and the backlight assembly 2 further includes a backplane 20. The mainboard 3 and the power board 4 are arranged on the backplane 20, some convex hull structures are generally stamped on the backplane 20, and the mainboard 3 and the power board 4 are amounted on the convex hulls by screws or hooks. The rear shell 5 houses the panel 1 to hide the backlight assembly 2, the mainboard 3, the power board 4 and other parts of the display apparatus, achieving an aesthetic effect; and the base 6 is configured to support the display apparatus.

Figure 2:
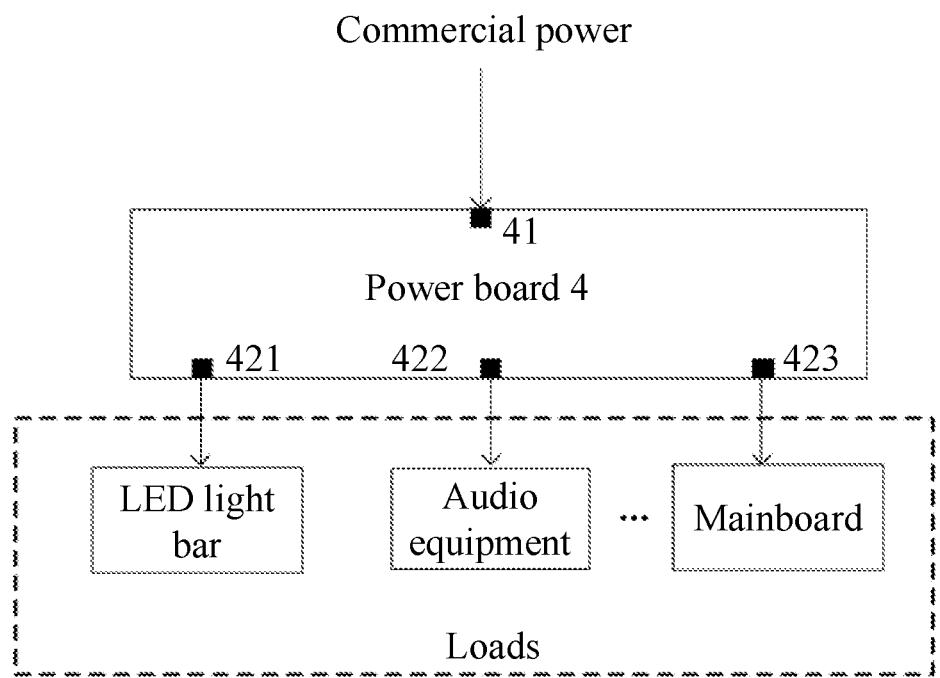
FIG. 2 is a schematic diagram of a connection relationship between the power board and a load.

In some embodiments, FIG. 2 is a schematic diagram of a connection relationship between the power board and the loads. As shown in FIG. 2, the power board 4 includes an input terminal 41 and output terminals 42 (a first output terminal 421, a second output terminal 422 and a third output terminal 423 are shown in the figure). The input terminal 41 is connected with the commercial power, and the output terminals 42 are connected with the loads, for example, the first output terminal 421 is connected with the LED light bars for lightening the display screen, the second output terminal 422 is connected with the audio equipment, and the third output terminal 423 is connected with the mainboard. The power board 4 is required to convert the AC commercial power into the DC power required by the loads, and the DC power generally has different specifications, for example, the audio equipment requires 18V, the panel requires 12V, and so on.

Figure 3:
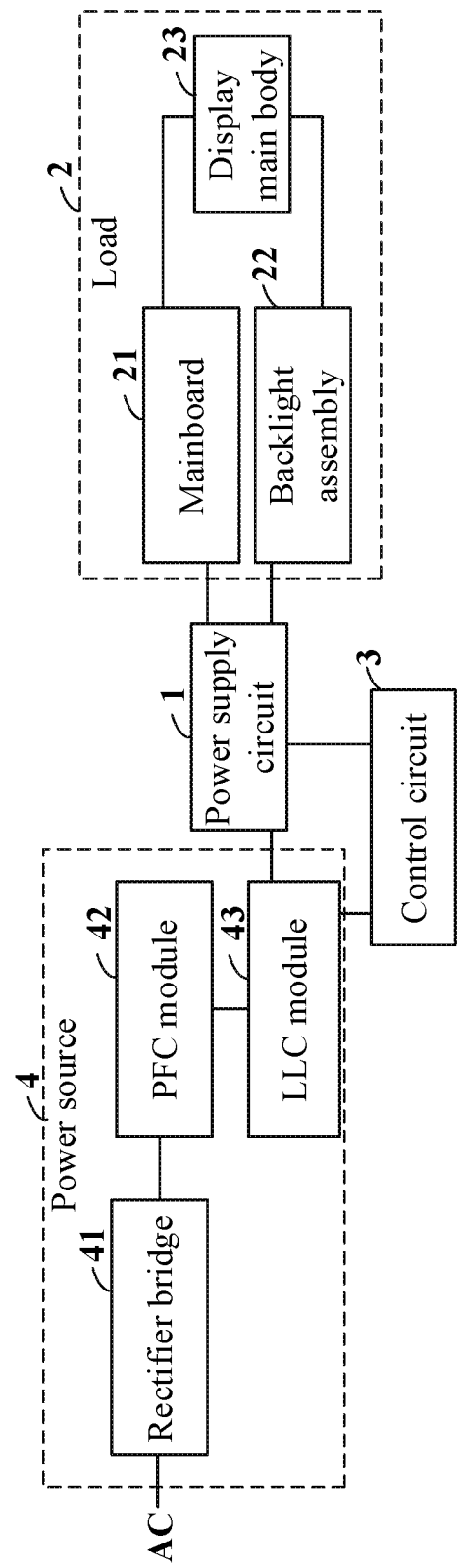
FIG. 3 is a schematic diagram of a power source architecture of a television.

The power source architecture of the display apparatus is discussed by taking a television as an example. FIG. 3 is a schematic diagram of the power source architecture of the television. As shown in FIG. 3, the display apparatus may include: a power supply circuit 1, a load 2, a control circuit 3 and a power source 4. The power source 4 includes: a rectifier bridge 41, a Power Factor Correction (PFC) module 42, and a resonant converter (LLC) module 43. The LLC module 43 includes a synchronous rectification circuit (not shown in FIG. 3). The PFC module 42 is connected with the LLC module 43, and the LLC module 43 is connected with the power supply circuit 1 and the control circuit 3 respectively.

Here, the rectifier bridge 41 is configured to rectify the input AC power, and input a full-wave signal to the PFC module 42. The PFC module 42 mainly performs power factor correction on the input AC power, and outputs a stable DC busbar voltage (e.g., 380V) to the LLC module 43. The PFC module 42 can effectively improve the power factor of the power source and ensure the same phase of the voltage and current. The LLC module 43 generally includes a synchronous rectification circuit, a Pulse Frequency Modulation (PFM) circuit, a capacitor, an inductor and other components. The LLC module 43 may decrease or increase the DC busbar voltage input from the PFC module 42, and output a constant voltage to the load 2. The power source 4 may further include a flyback module (not shown in FIG. 3) for providing its own supply voltage and standby power to the PFC module 42 and the LLC module 43.

The control circuit 3 is connected with the power source 4 and the power supply circuit 1 respectively, and can control whether the power supply circuit 1 is turned on, that is, whether the electric energy output from the LLC module 43 can supply power to the load 2 through the power supply circuit, to realize turning on or off of the load. The power supply circuit 1 is also connected with the LLC module and the load. When the power supply circuit 1 is connected, the LLC module 43 can supply power to the load 2; and when the power supply circuit 1 is disconnected, the LLC module 43 cannot supply power to the load 2. The load 2 includes a mainboard 21, a backlight assembly 22, a display main body 23, etc.

Figure 4:
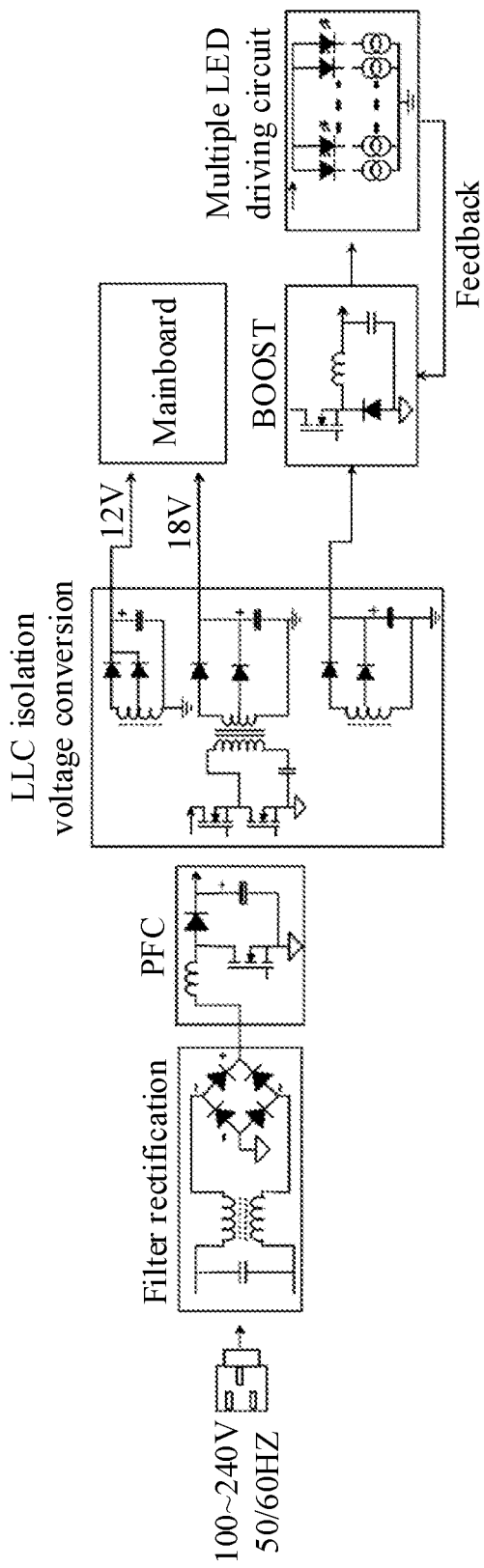
FIG. 4 shows a structural schematic diagram of a power supply circuit for supplying power to a mainboard and a LED light bar.

In some embodiments, taking a television as an example of the display apparatus, FIG. 4 shows a structural schematic diagram of a power supply circuit for supplying power to a mainboard and LED light bars. The electric AC power (100V-240V, 50-60 Hz) obtained by the power supply circuit successively passes through the filter rectification module (rectifier bridge), the PFC module and the LLC module to supply power to the mainboard, a plurality of LED light bars and other loads (which are not shown in FIG. 4) of the display apparatus.

Since the required voltage range is related to factors such as the working environment of the plurality of LED light bars, the hardware characteristics and life span of the LED components, the voltage required by the plurality of LED light bars has a certain degree of variation, and the degree of variation is limited. Therefore, the secondary winding of the LLC module that supplies power to the plurality of LED light bars is additionally connected with a voltage adjustment module (such as a buck circuit or a boost circuit, the boost circuit is taken as an example in FIG. 4) and a voltage drive module. The voltage adjustment module can adjust the voltage directly output from the secondary winding according to the feedback result of the real-time current of the plurality of LED light bars and transmit the adjusted voltage to the voltage drive module, so that the voltage drive module controls the plurality of LED light bars to work at the rated current according to the voltage received, to prevent excessive current from flowing through the LED components in the plurality of LED light bars to cause damage to the components. However, in the power supply circuit shown in FIG. 4, the voltage stress of the voltage adjustment module set for the plurality of LED light bars in the power supply circuit is relatively large, therefore withstand voltage of the components such as switch transistor and capacitors in the voltage adjustment module is higher and the power supply circuit takes a relatively large area of the PCB, resulting in higher cost of the power supply circuit.

Therefore, the disclosure provides a display apparatus and a power supply circuit. It allows for flexibly setting the voltage ranges output from two different secondary windings, so that the voltage adjustment module only needs to adjust the voltage output from one of the secondary windings, thereby reducing the requirement on the withstand voltage of components such as switch transistor and capacitors in the voltage adjustment module, then reducing the area of the PCB where the power supply circuit is located, and finally reducing the cost of the power supply circuit.

Embodiments of the disclosure will be described in detail below. Several embodiments below can be combined with each other, and the same or similar elements or processes may be omitted in some embodiments.

Figure 5:
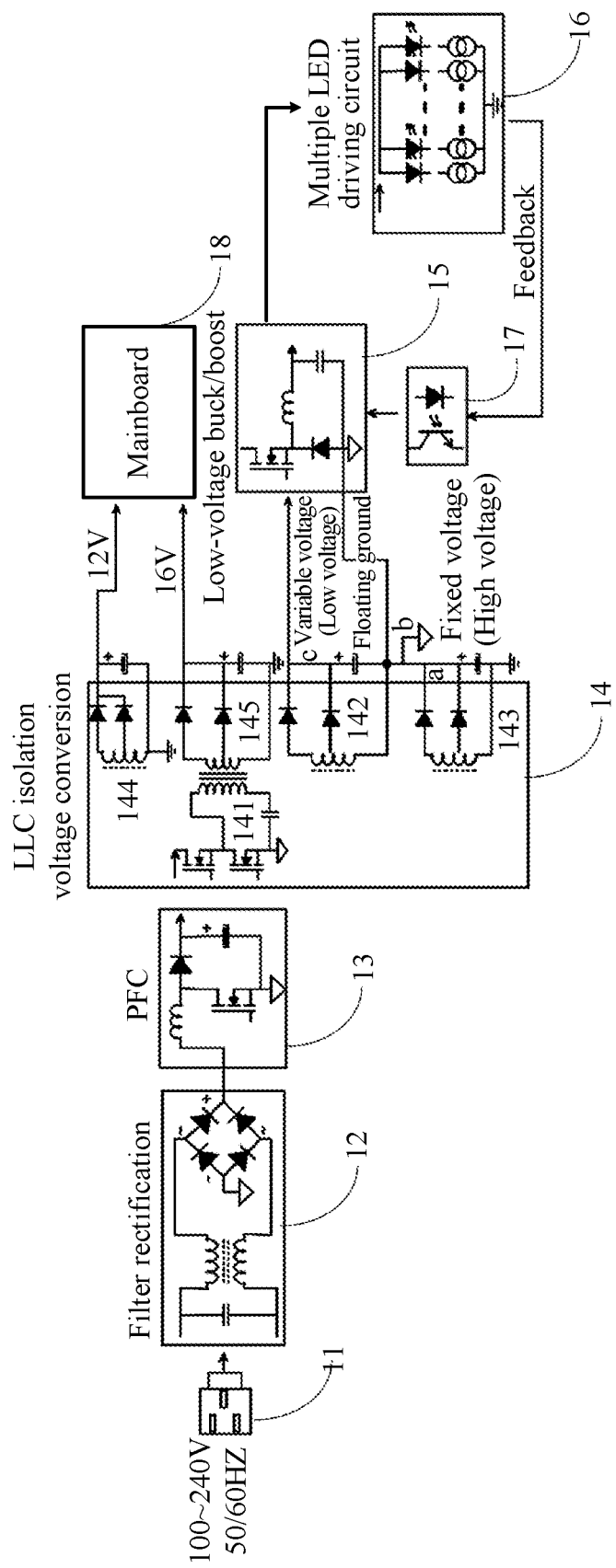
FIG. 5 is a structural schematic diagram of a power supply circuit of a display apparatus according to an embodiment of the disclosure.

FIG. 5 is a structural schematic diagram of a power supply circuit of a display apparatus according to an embodiment of the disclosure. As shown in FIG. 5, the power supply circuit includes a power source 11, a filter rectification module 12, a PFC module 13, an LLC module 14 and loads. Here, the loads at least include a mainboard 18 and a plurality of LED light bars shown in the figure.

After the LLC module 14 of the power supply circuit in this embodiment receives the DC voltage sent from the PFC module 13 through a primary winding 141, different secondary windings output different voltages according to the voltage of the primary winding 141 to supply power to different loads. For example, a secondary winding 144 outputs and provides a voltage of 12V to the mainboard 18 according to the voltage of the primary winding 141, and a secondary winding 145 outputs and provides a voltage of 16V to the mainboard 18 according to the voltage of the primary winding 141.

In this embodiment, two different LLC secondary windings are set in the LLC module 14 to supply power to the plurality of LED light bars, including: a first LLC secondary winding 142 and a second LLC secondary winding 143. An output terminal c of the first secondary winding 142 outputs a first voltage, and an output terminal a of the second secondary winding 143 outputs a second voltage; the output terminal a of the second secondary winding 143 is connected with an input terminal b of the first secondary winding 142; at the same time, both the input terminal b and the output terminal c of the first LLC secondary winding 142 are connected with the voltage adjustment module 15, the voltage adjustment module 15 may be configured to adjust the first voltage output from the first LLC secondary winding 142. The voltage adjusted by the voltage adjustment module 15 is denoted as a third voltage. The voltage adjustment module 15 may send the third voltage together with the second voltage output from the second LLC secondary winding 143 to the voltage drive module 16, and the voltage drive module 16 supplies power to the plurality of LED light bars according to the sum of the second voltage and the third voltage.

At this time, the second voltage output from the second LLC secondary winding 143 is equivalent to a "fixed voltage" that does not change, and the first voltage output from the first LLC secondary winding 142 is equivalent to a "variable voltage" that changes, Therefore, an adjustable variable voltage output is added on the basis of the fixed second voltage, and the fixed voltage and the variable voltage output from the two secondary windings together supply power to the plurality of LED light bars. Such power supply form may also be called as "stepped power supply".

In some embodiments, the first voltage output from the first LLC secondary winding is less than the second voltage output from the second LLC secondary winding. For example, if the plurality of LED light bars in FIG. 5 is 16 LED light bars and each light bar includes 9 LED components, in a case of 120 mA, the voltage range required by the plurality of LED light bars is 51.3V-58.5V with a total current of 1.92 A. Then, for the stepped power supply implemented by the buck structure, the fixed second voltage output from the second LLC secondary winding may be set to 48V, the floating output of the first voltage output from the first LLC secondary winding may be set to 12V, and the voltage range adjusted by the voltage adjustment module may be set to 3.3V-10.5V. In this case, the DC-DC parameters for the buck topology structure are: the input voltage is 12V, the output voltage range is 3.3V-10.5V, and the output current is 1.92 A. For the stepped power supply implemented by the boost structure, the second voltage may be set to 40V, the floating output of the first voltage may be set to 10V, and then the DC-DC parameters for the boost topology are: the input voltage is 10V, the output voltage range is 11.3V-18.5V, and the output current is 1.92 A. The above buck topology structure and boost topology structure may be selected according to engineering requirements. For example, the buck topology structure has the advantage of low cost, but the output voltage range is narrow; while the boost topology structure has the advantage of a wide output voltage range, but its cost is relatively high.

As a comparison, as shown in FIG. 4, the DC-DC parameters of the boost topology structure that supplies power to the plurality of LED light bars after adjustment by only one secondary winding are: the input voltage is 45V, the output voltage range is 51.3V-58.5V, and the output current is 1.92 A. Obviously, the power supply circuit provided by this embodiment can flexibly set two different voltages output from two different secondary windings respectively, and the voltage adjustment module only needs to adjust the voltage output from one secondary winding with a smaller voltage, thereby reducing the requirement on the withstand voltage of components such as switch transistor and capacitors in the voltage adjustment module, then reducing the area of the PCB where the power supply circuit is located, and finally reducing the cost of the power supply circuit.

When measured from the DC-DC conversion efficiency, the DC-DC loss when the power supply circuit in this embodiment adopts the buck topology structure may be calculated by 7V*1.92 A*0.05/0.95+0.5V*1.92 A=1.67 W, and the total efficiency at this time is 98.5%; and the DC-DC loss of the power supply circuit shown in FIG. 4 may be calculated by 55V*1.92 A*0.05/0.95=5.55 W, and the total efficiency at this time is 95%; it can be seen that the power supply circuit further improves the DC-DC conversion efficiency by 3.5%.

In an embodiment as shown in FIG. 5, the voltage drive module 16 may also send a feedback signal to the voltage adjustment module 15 according to the real-time current of the plurality of LED light bars when supplying power to the plurality of LED light bars, so that the voltage adjustment module 15 adjusts the first voltage into a new third voltage according to the feedback signal, to realize the timely and effective adjustment of the voltage by the voltage adjustment module.

In some embodiments, there are at least two connection relationships of power supply and feedback between the voltage adjustment module 15 and the voltage drive module 16. However, when the voltage adjustment module 15 performs the DC-DC adjustment, the ground terminal of the voltage adjustment module 15 is connected with the output terminal of the second secondary winding, and the voltage value of the voltage adjustment module 15 is not 0V grounded, but the output voltage of the first secondary winding is adjusted on the basis of the value of the output voltage of the second secondary winding. Therefore, the feedback signal sent from the voltage drive module 16 to the voltage adjustment module also needs to pass through the optocoupler 17, so that the optocoupler performs the floating voltage conversion on the feedback signal and performs the opto-coupling isolation on the feedback signal sent from the voltage drive module to the voltage adjustment module, so that the floating voltage of the voltage adjustment module 15 and the actual ground voltage of the voltage drive module 16 on both sides of the optocoupler are unified to prevent the mutual influence between the voltage adjustment module 15 and the voltage drive module 16.

Figure 6:
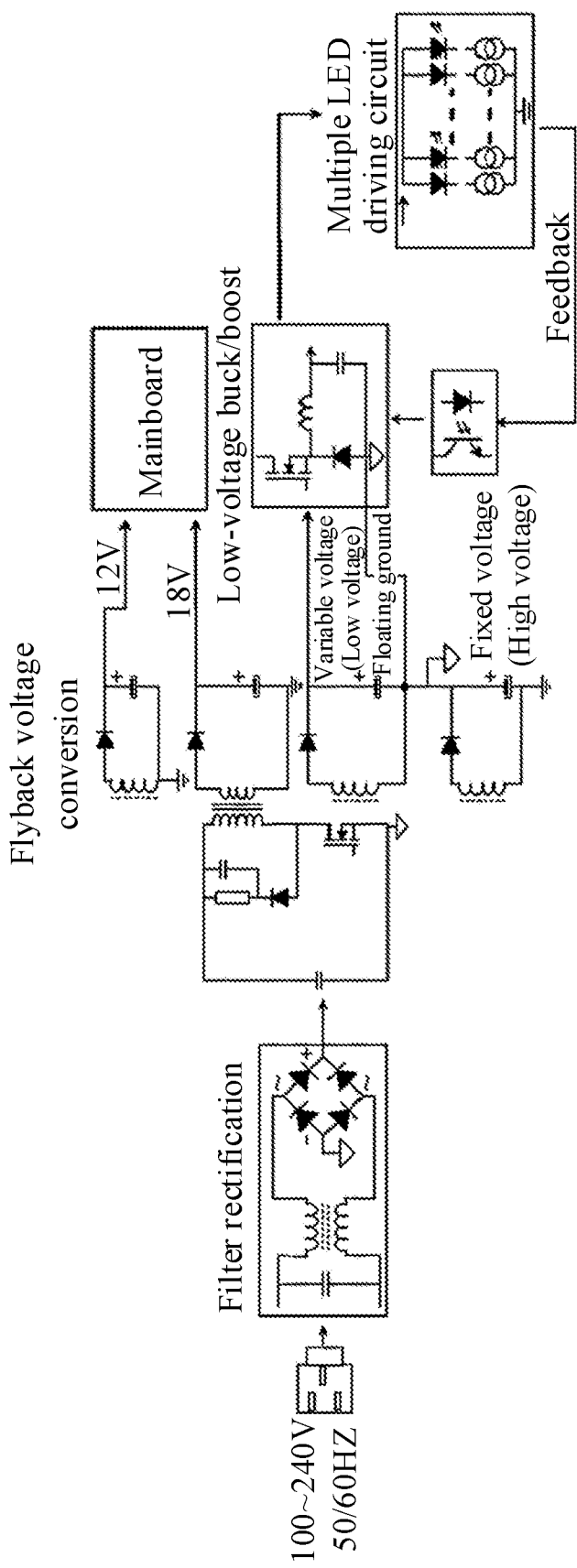
FIG. 6 is a structural schematic diagram of a power supply circuit of a display apparatus according to an embodiment of the disclosure.

FIG. 6 is a structural schematic diagram of a power supply circuit of a display apparatus according to an embodiment of the disclosure. Both the power supply circuit shown in FIG. 6 and the power supply circuit shown in FIG. 5 are implemented based on a concept that two different voltages output respectively from two different secondary windings are set and the voltage adjustment module only needs to adjust the voltage output from the secondary winding with the smaller voltage. The difference lies in that: the power supply circuit in an embodiment shown in FIG. 6 adopts a single flyback structure where the first and second secondary windings output voltages through the primary winding in the single flyback structure; while the first and second secondary windings set in an embodiment shown in FIG. 5 output voltages based on the primary winding in the LLC module. The principles of other modules and the power supply circuit shown in FIG. 6 are similar to those of the embodiment shown in FIG. 5, and will omit here.

Figure 7:
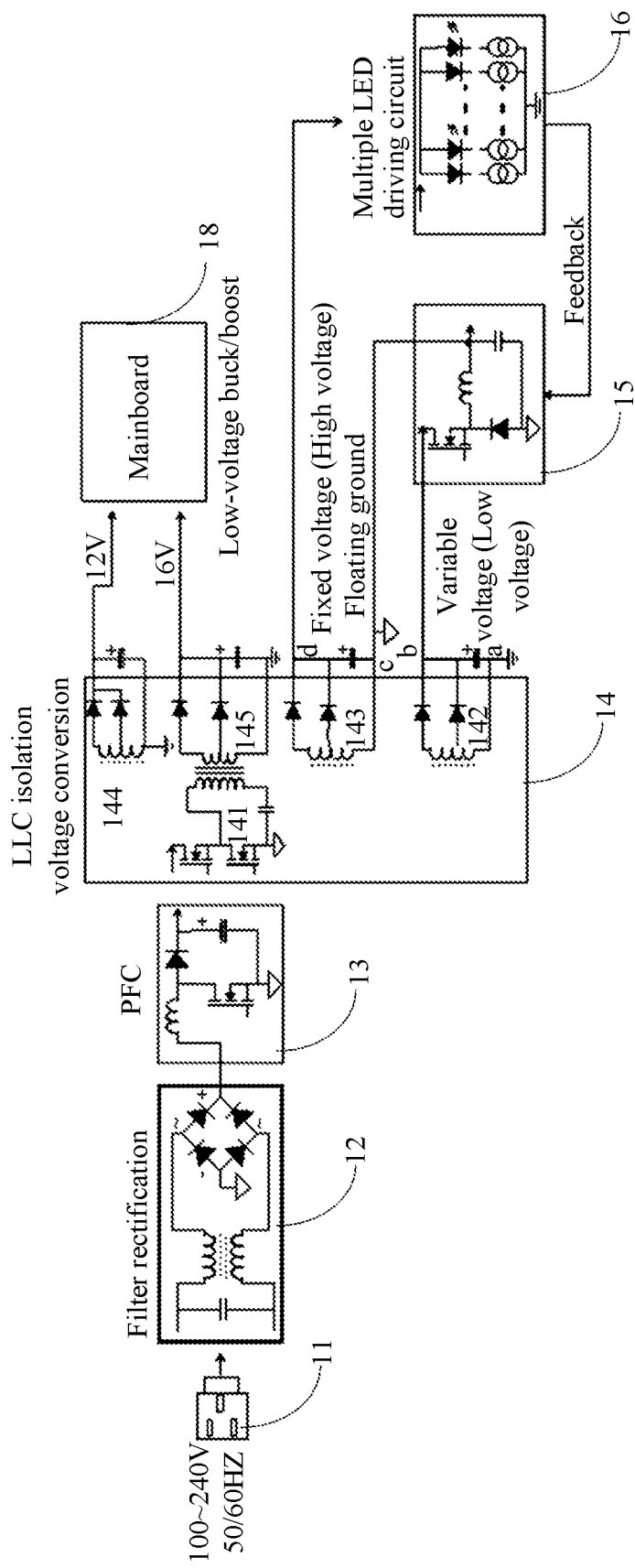
FIG. 7 is a structural schematic diagram of a power supply circuit of a display apparatus according to an embodiment of the disclosure.

FIG. 7 is a structural schematic diagram of a power supply circuit of a display apparatus according to an embodiment of the disclosure, where the power supply circuit may also be applied in the display apparatus described in any one of FIGS. 1-3. In the power supply circuit shown in FIG. 7, on the basis of the power supply circuit shown in FIG. 5, the output terminal of the first secondary winding is connected with the input terminal of the second secondary winding, and the power is supplied to a plurality of LED light bars through the output terminal of the second secondary winding. In this case, for the output voltage of the first secondary winding adjusted by the voltage adjustment module, the input terminal of the first secondary winding is grounded instead of floating, so no optocoupler may be set to perform the opto-coupling isolation on the feedback signal in an embodiment shown in FIG. 7.

The LLC module of the power supply circuit shown in FIG. 7 has a first LLC secondary winding 142 and a second LLC secondary winding 143. The input terminal a of the first secondary winding 142 is grounded, the output terminal b of the first secondary winding 142 is connected with the input terminal c of the second secondary winding 143 through the voltage adjustment module 15, and the output terminal d of the second LLC secondary winding 143 is connected with the voltage drive module. The output terminal b of the first secondary winding 142 is used to output a first voltage, and the voltage adjustment module 15 may be configured to adjust the first voltage output from the first LLC secondary winding 142. The voltage adjusted by the voltage adjustment module 15 is denoted as a third voltage. The voltage adjustment module 15 may send the third voltage to the input terminal c of the second LLC secondary winding 143. The second LLC secondary winding 143 is used to output a second voltage, the input terminal c of the second LLC secondary winding 143 is equivalent to having the floating third voltage, the output terminal d of the second LLC secondary winding 143 sends the sum of the third voltage and the second voltage jointly to the voltage drive module 16, and the voltage drive module 16 supplies power to the plurality of LED light bars according to the sum of the second voltage and the third voltage.

In this case, the second voltage output from the second LLC secondary winding 143 is equivalent to a "fixed voltage" that does not change, and the first voltage output from the first LLC secondary winding 142 is equivalent to a "variable voltage" that changes. Therefore, an adjustable variable voltage output is added on the basis of the fixed second voltage, and the fixed voltage and the variable voltage output from the two secondary windings together supply power to the plurality of LED light bars. Such power supply form may also be called as "stepped power supply". Alternatively, the first voltage output from the first LLC secondary winding is less than the second voltage output from the second LLC secondary winding.

Thus, the power supply circuit in this embodiment can flexibly set two different voltages output from two different secondary windings respectively, and the voltage adjustment module only needs to adjust the voltage output from one secondary winding with a smaller voltage, thereby reducing the requirement on the withstand voltage of components such as switch transistor and capacitors in the voltage adjustment module, then reducing the area of the PCB where the power supply circuit is located, and finally reducing the cost of the power supply circuit. In addition, the present embodiment does not need to install an optocoupler, and also reduces the complexity of the power supply circuit and further reduces the cost of the power supply circuit.

Figure 8:
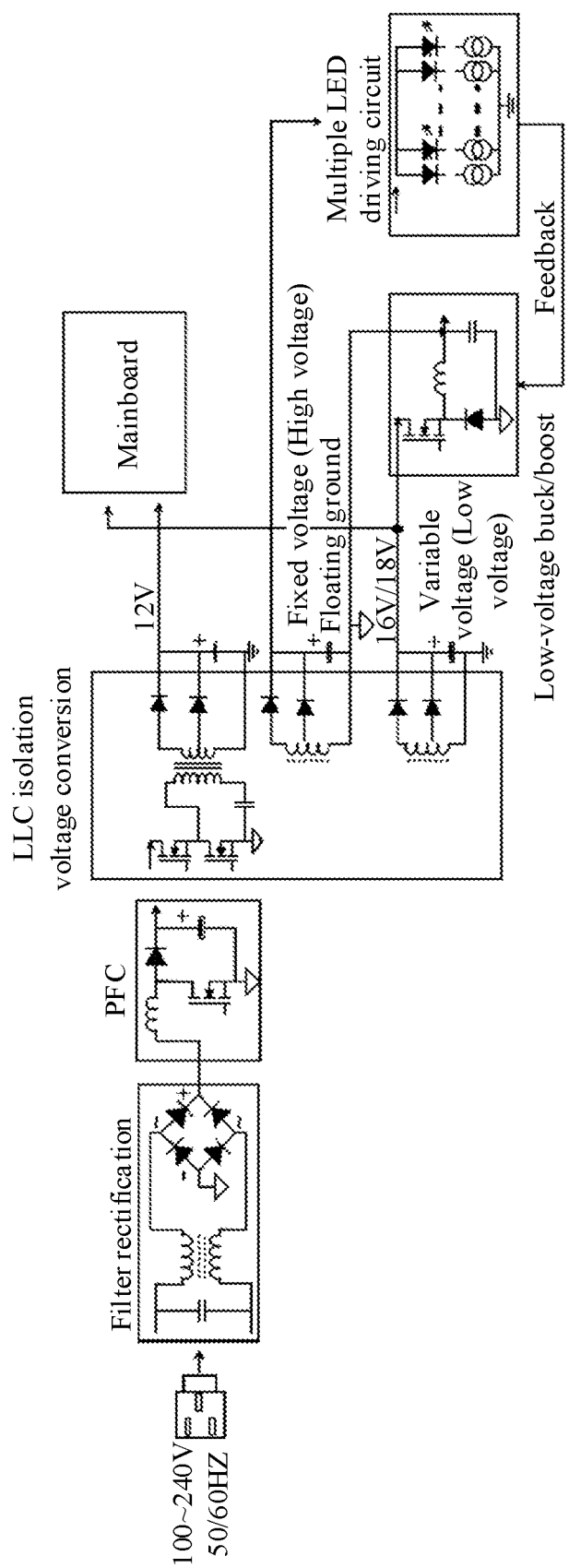
FIG. 8 is a structural schematic diagram of a power supply circuit of a display apparatus according to an embodiment of the disclosure.

FIG. 8 is a structural schematic diagram of a power supply circuit of a display apparatus according to an embodiment of the disclosure. In the power supply circuit shown in FIG. 8, on the basis of the power supply circuit shown in FIG. 5, if the required variation range of the first voltage output from the first LLC secondary winding can be 16V/18V, the secondary winding that provides the voltage 16V/18V to the mainboard may be taken as the first LLC secondary winding, and thus it is not necessary to separately set the first LLC secondary winding in this case. Compared with an embodiment shown in FIG. 5, the complexity of the power supply circuit can be further reduced, thereby reducing the cost. It can be understood that, as shown in FIG. 8, only the voltage 16V/18V of the mainboard is taken as an example. If the required variation range of the first voltage is within 12V, the secondary winding that provides the voltage 12V to the mainboard may be taken as the first LLC secondary winding; or, in other implementations, the secondary winding that provides a certain voltage to other loads may also be taken as the first LLC secondary winding, etc., and the implementation and principle thereof is the same as the above and will not be repeated.

In the foregoing embodiments of the disclosure, the power supply circuit provides the stepped power supply voltage to the drive module of the plurality of LED light bars. In other scenarios, the power supply circuit may also supply the stepped power supply voltage to each of at least one LED light bar individually. This scenario will be described in following embodiments of the disclosure.

Figure 9:
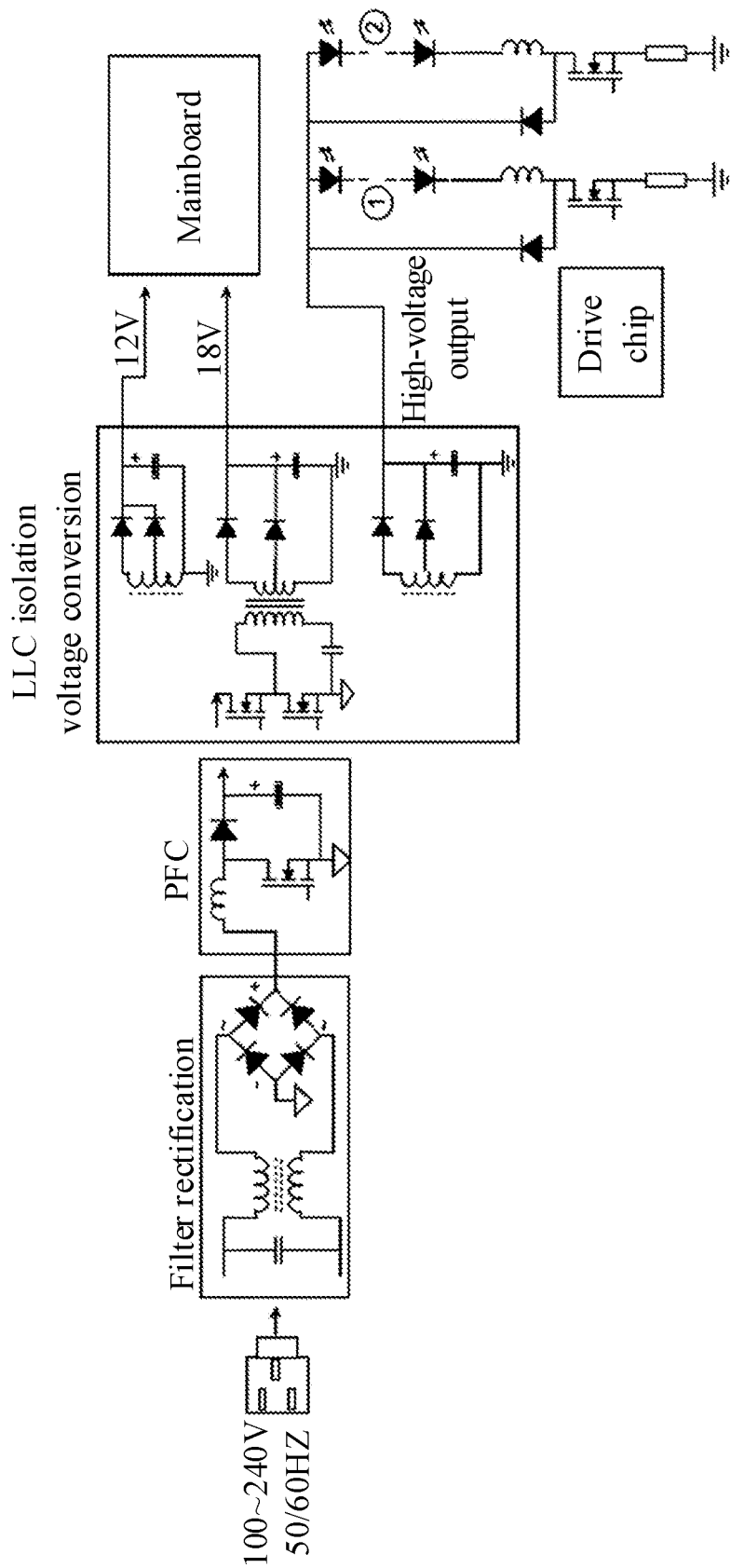
FIG. 9 is a structural schematic diagram of a power supply circuit of a display apparatus in related art.

FIG. 9 is a structural schematic diagram of a power supply circuit of a display apparatus in related art, where the electric AC power (100V-240V, 50-60 Hz) obtained by the power supply circuit supplies power to the mainboard, at least one LED light bar and other loads of the display apparatus after passing through the filter rectification module (rectifier bridge), the PFC module and the LLC module successively. In FIG. 9, the at least one LED light bar includes two LED light bars marked with ① and ② as an example for illustration, and other loads are not shown in FIG. 9. Here, the first secondary winding in the LLC module provides a voltage of 12V to the mainboard, the second secondary winding provides a voltage of 18V to the mainboard, and the third secondary winding provides a voltage to the LED light bars ① and ②. For the same reason as the power supply circuit shown in FIG. 4, each of the at least one LED light bar needs to work with a voltage drop within a certain range to reach the rated current of the LED components. Therefore, each of the output terminals of the LED light bars ① and ② in FIG. 9 is connected with a voltage adjustment module implemented based on a buck circuit. The voltage adjustment module adjusts the voltage output from the secondary winding to the corresponding LED light bar, so that the LED light bar works at the rated current to prevent the excessive current from flowing through the LED components in the LED light bar to cause damage to the components.

However, the voltage stress of the voltage adjustment module connected with each LED light bar in the power supply circuit is relatively large. For example, when the voltage range required by the LED light bar is 5.7V-6.5V, the voltage adjustment module needs to perform the boosting or bucking adjustment on the voltage greater than 5V, causing a relatively high withstand voltage of components such as switch transistor and capacitors in the voltage adjustment module and thus occupying a relatively large area of the PCB where the power supply circuit is located, and finally increasing the cost of the power supply circuit.

Figure 10:
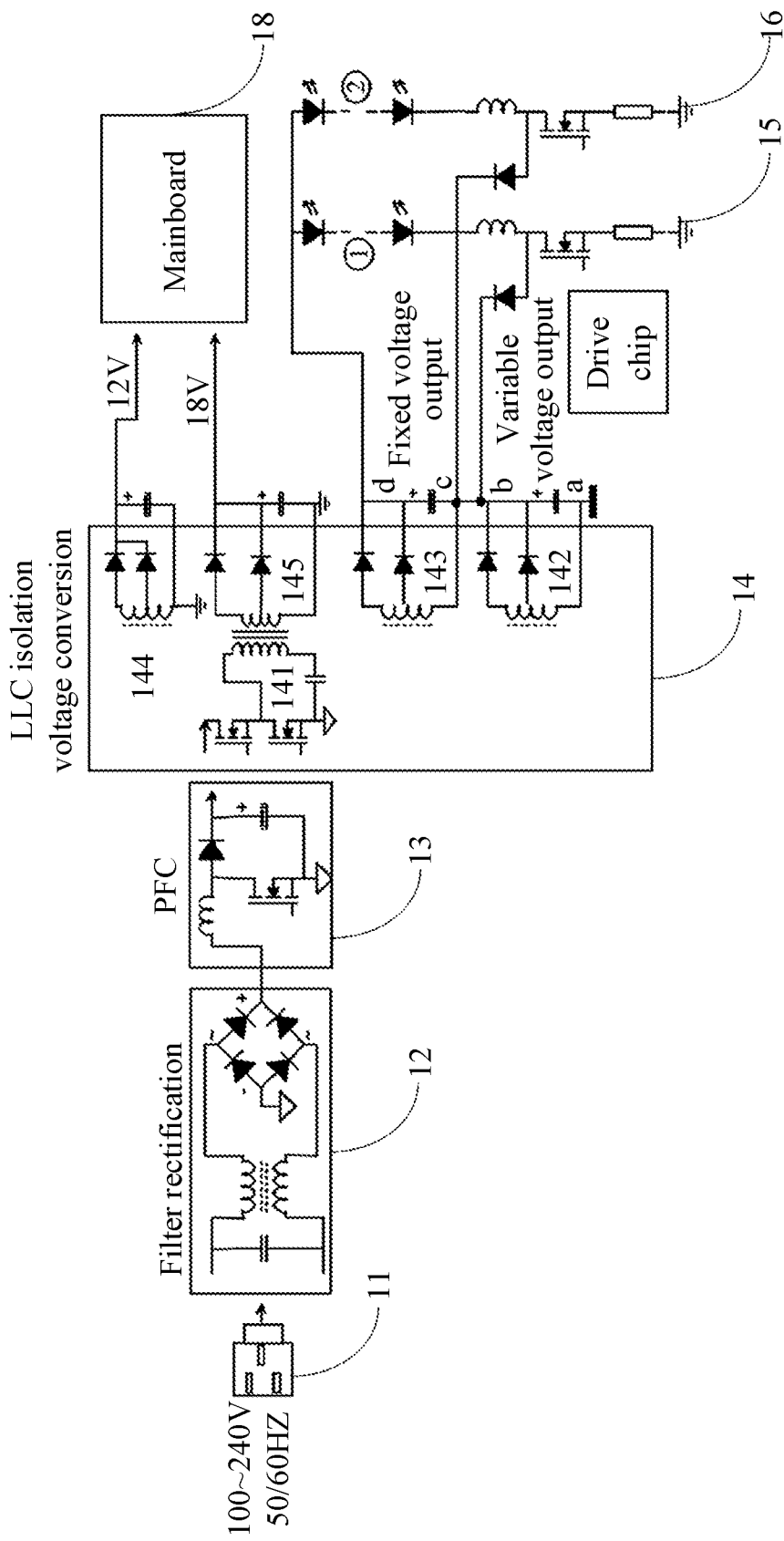
FIG. 10 is a structural schematic diagram of a power supply circuit of a display apparatus according to an embodiment of the disclosure.

In view of the above issues, FIG. 10 is a structural schematic diagram of a power supply circuit in a display apparatus according to an embodiment of the disclosure. The power supply circuit includes: a power source 11, a filter rectification module 12, a PFC module 13, an LLC module 14 and loads, where the loads at least include a mainboard 18 and LED light bars ① and ② shown in the figure. The secondary winding 144 outputs and provides a voltage of 12V to the mainboard 18 according to the voltage of the primary winding 141, and the secondary winding 145 outputs and provides a voltage of 18V to the mainboard 18 according to the voltage of the primary winding 141.

In this embodiment, two different LLC secondary windings are configured in the LLC module 14 to supply power to at least one LED light bar. The two different LLC secondary windings include: a first LLC secondary winding 142 and a second LLC secondary winding 143. The input terminal a of the first secondary winding 142 is grounded, the output terminal b of the first secondary winding 142 is connected with the input terminal c of the second secondary winding 143, and the output terminal d of the second LLC secondary winding 143 is connected with the positive electrodes of the LED light bars ① and ② respectively. The output terminal b of the first secondary winding 142 is used to output a first voltage, and then the voltage adjustment module 15 connected with the LED light bar ① and implemented based on the buck circuit may be configured to adjust the first voltage output from the first LLC secondary winding 142. The adjusted voltage is denoted as a third voltage. The voltage adjustment module 15 may send the third voltage to the input terminal c of the second LLC secondary winding 143. The second LLC secondary winding 143 is used to output a second voltage, and the output terminal d of the second LLC secondary winding 143 sends the sum of the third voltage and the second voltage to the LED light bar ① for power supply. Similarly, the voltage adjustment module 16 connected with the LED light bar ② and implemented based on the buck circuit may be configured to adjust the first voltage output from the first LLC secondary winding 142. The adjusted voltage is denoted as a fourth voltage. The voltage adjustment module 16 may send the fourth voltage to the input terminal c of the second secondary winding 143. The second LLC secondary winding 143 is used to output a second voltage, and the output terminal d of the second LLC secondary winding 143 sends the sum of the fourth voltage and the second voltage to the LED light bar ② for power supply.

The second voltage output from the second LLC secondary winding 143 is equivalent to a "fixed voltage" that does not change, and the first voltage output from the first LLC secondary winding 142 is equivalent to a "variable voltage" that changes. Therefore, an adjustable variable voltage output is added on the basis of the fixed second voltage, and the fixed voltage and the variable voltage output from the two secondary windings together supply power to the LED light bars. Such power supply form may also be referred as "stepped power supply". In particular, each LED light bar may be connected with an individual voltage adjustment module, so that each voltage adjustment module can adjust the voltage of the connected LED light bar more effectively.

In an embodiment shown in FIG. 10, two LED light bars are taken as an example for illustration. The power supply circuit may also include any other number of LED light bars.

In some embodiments, the first voltage output from the first LLC secondary winding is less than the second voltage output from the second LLC secondary winding. The voltage in the fixed voltage part plus the voltage in the variable voltage part should be about the overall voltage drop required by the LED light bar, otherwise the circuit will not work normally; and meanwhile, the voltage drop of the fixed voltage part cannot be greater than the minimum voltage required for lighting of the LED light bar, otherwise the LED light bar will be lit out of control.

Figure 11:
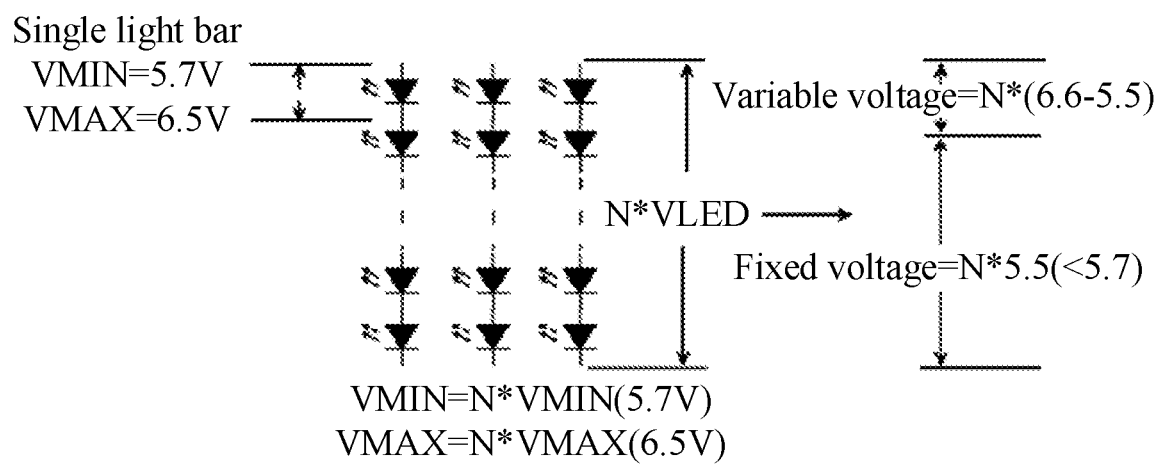
FIG. 11 is a schematic diagram of a voltage range of a LED light bar of the disclosure.

For example, FIG. 11 is a schematic diagram of a voltage range of an LED light bar according to an embodiment of the disclosure. The LED light bar in the display apparatus has a range of voltage drop in the case of the constant current due to factors in the manufacturing process. Assuming that the voltage of the LED light bar is 6V, the voltage range of the LED light bar may be 5.7-6.5V. Therefore, in this embodiment, in order to achieve the output voltage range of the power supply for the LED light bar to reach 5.7-6.5V, the fixed second voltage output from the second secondary winding may be set as 5.7V, and the variable first voltage output from the first secondary winding may be set as about 0.8V. In this case, although the voltage drop of the LED light bar is uncertain, the ratio of the uncertain voltage to the total voltage is not high in the case of the constant current. The range of 5.7V-6.5V, the variable voltage of merely 0.8V and the fixed voltage of 5.7V can meet the driving requirement of the LED light bar.

Thus, the power supply circuit in this embodiment can flexibly set two different voltages output from two different secondary windings respectively, and the voltage adjustment module only needs to adjust the voltage output from one secondary winding with a smaller voltage, thereby reducing the requirement on the withstand voltage of components such as switch transistor and capacitors in the voltage adjustment module, then reducing the area of the PCB where the power supply circuit is located, and finally reducing the cost of the power supply circuit. In addition, the present embodiment does not need to install an optocoupler, and also reduces the complexity of the power supply circuit and further reduces the cost of the power supply circuit.

Figure 12:
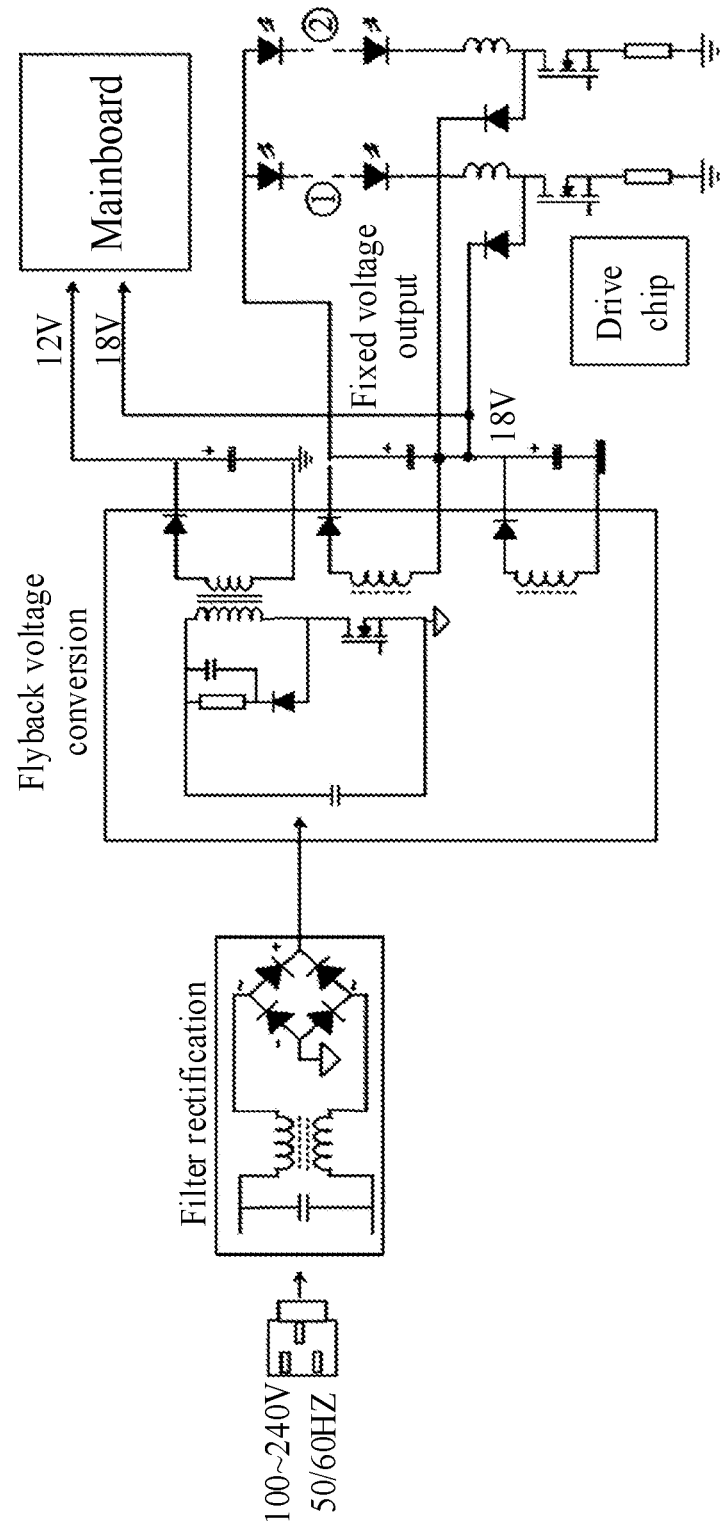
FIG. 12 is a structural schematic diagram of a power supply circuit of a display apparatus according to an embodiment of the disclosure.

FIG. 12 is a structural schematic diagram of a power supply circuit in a display apparatus according to an embodiment of the disclosure. Both the power supply circuit shown in FIG. 12 and the power supply circuit shown in FIG. 10 adopt the following structure: two different voltages output respectively from two different secondary windings are set to jointly supply power to the LED light bars, and the voltage adjustment module only needs to adjust the voltage output from the secondary winding with the smaller voltage. The difference lies in that: the power supply circuit in an embodiment shown in FIG. 12 adopts a single flyback structure in which the first and second secondary windings output voltages through the primary winding in the single flyback structure; while the first and second secondary windings set in an embodiment shown in FIG. 10 output voltages based on the primary winding in the LLC module. The principles of other modules and the power supply circuit shown in FIG. 12 are similar to those of the embodiment shown in FIG. 10, and will not be repeated.

Figure 13:
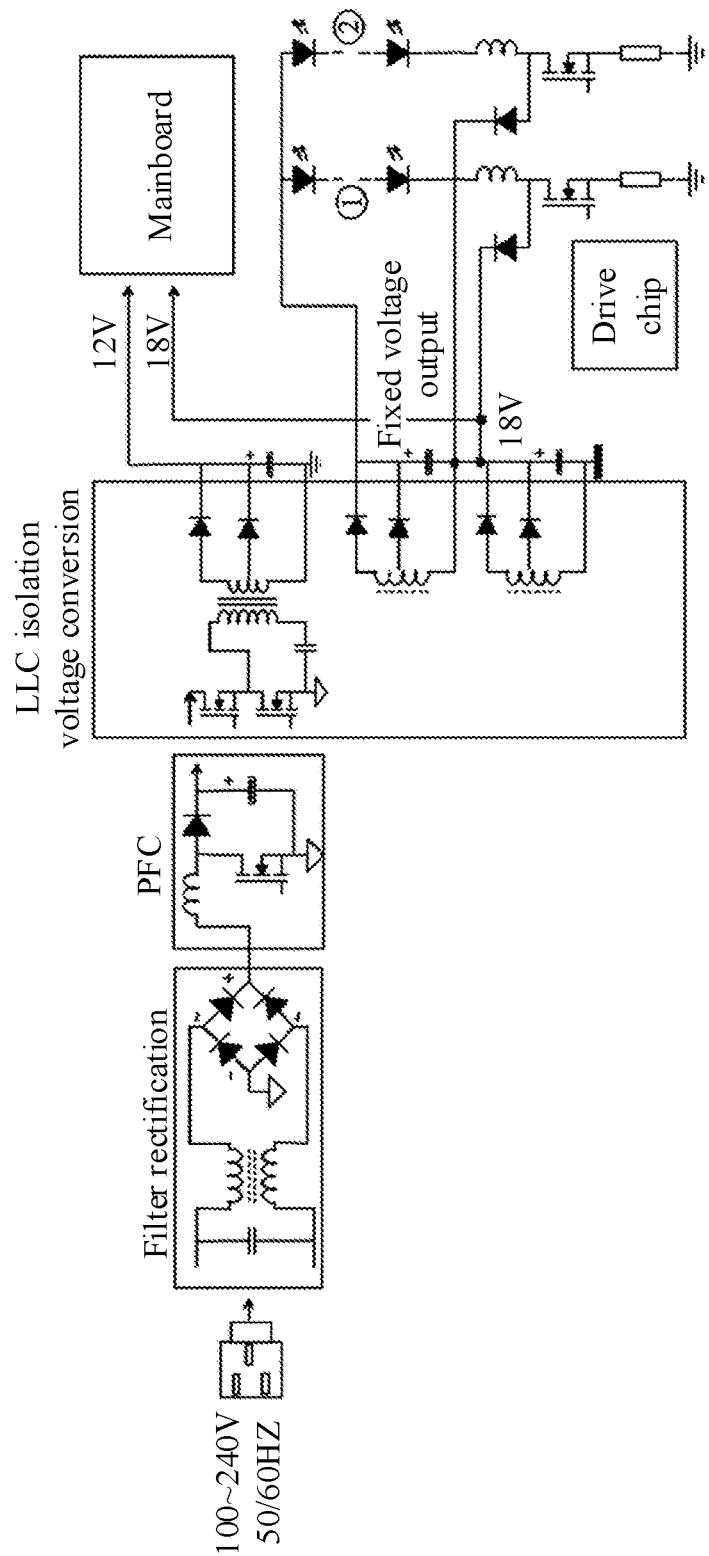
FIG. 13 is a structural schematic diagram of a power supply circuit of a display apparatus according to an embodiment of the disclosure.

FIG. 13 is a structural schematic diagram of a power supply circuit of a display apparatus according to an embodiment of the disclosure. Here, in the power supply circuit shown in FIG. 13, on the basis of the power supply circuit shown in FIG. 10, if the required variation range of the first voltage output from the first LLC secondary winding may be 18V, the secondary winding that provides the voltage 18V to the mainboard may be taken as the first LLC secondary winding, and thus it is not necessary to separately set the first LLC secondary winding in this case. Compared with an embodiment shown in FIG. 10, the complexity of the power supply circuit can be further reduced, thereby reducing the cost. It can be understood that, as shown in FIG. 13, the voltage 18V of the mainboard is taken as an example. If the required variation range of the first voltage is within 12V, the secondary winding that provides the voltage 12V to the mainboard may be taken as the first LLC secondary winding; or, in other implementations, the secondary winding that provides a certain voltage to other loads may also be taken as the first LLC secondary winding, etc., and the implementation and principle thereof is similar and will omit here.

Figure 14:
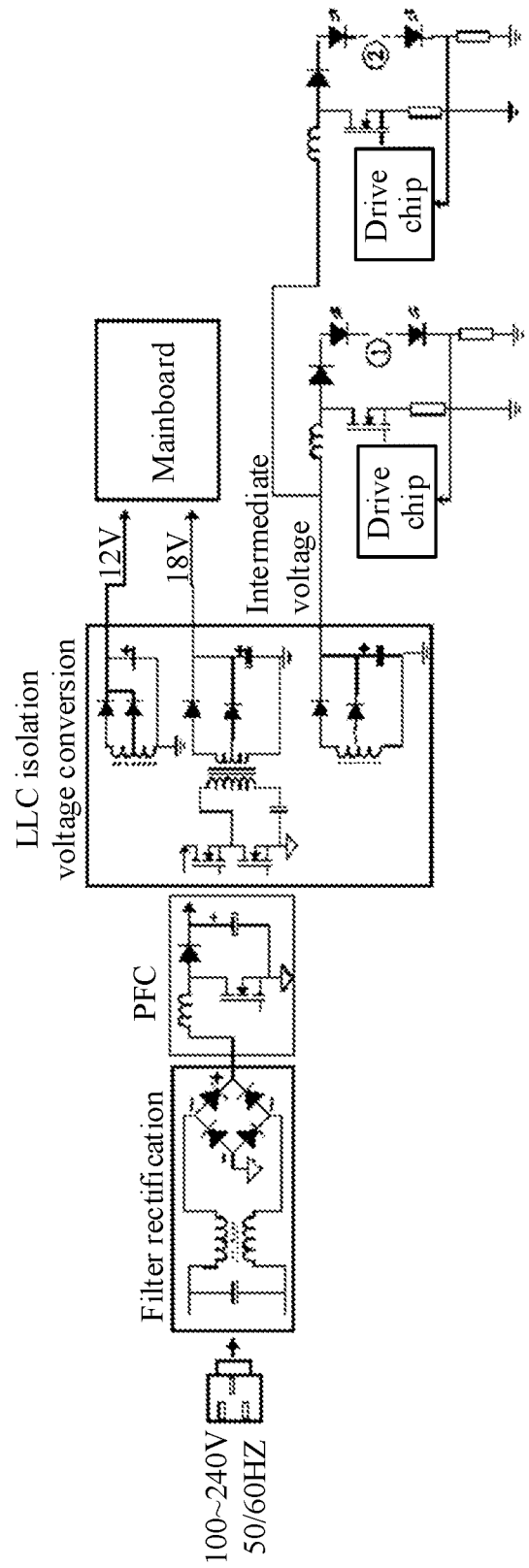
FIG. 14 is a structural schematic diagram of a power supply circuit of a display apparatus in related art.

FIG. 14 is a structural schematic diagram of a power supply circuit of a display apparatus in related art. Here, in the foregoing embodiment, the voltage adjustment module implemented based on the buck circuit is taken as an example; and in other implementations, the voltage adjustment module may also be implemented based on the boost circuit. In the power supply circuit in related art shown in FIG. 14, the first secondary winding in the LLC module provides a voltage of 12V to the mainboard, the second secondary winding provides a voltage of 18V to the mainboard, and the third secondary winding provides a voltage to the LED light bars ① and ②. Similarly, in the power supply module shown in FIG. 14, the withstand voltage of components such as switch transistor and capacitors in the voltage adjustment module is relatively high, then the PCB area consumed by the power supply circuit is relatively large, as a result, the cost of the power supply circuit is increased.

Figure 15:
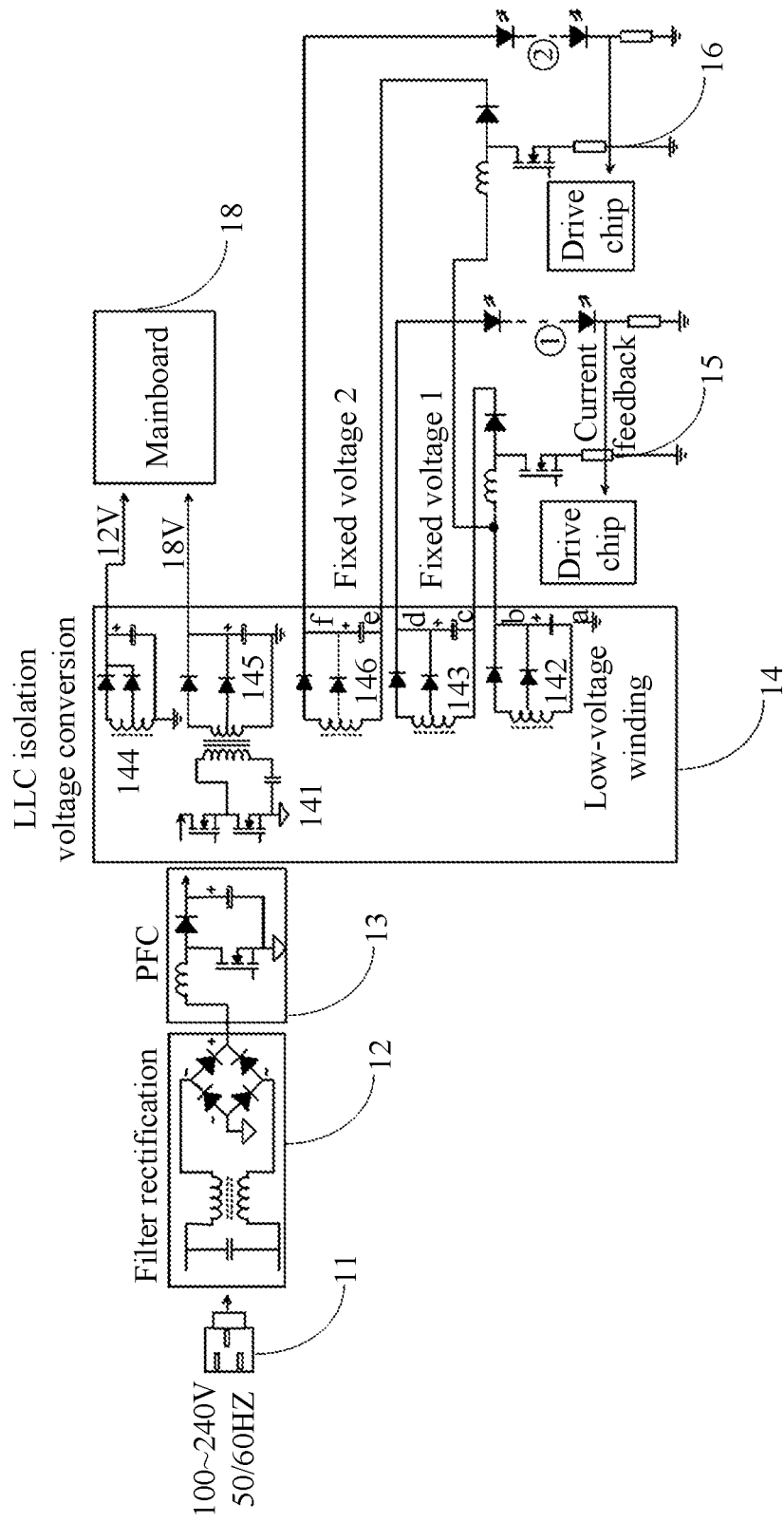
FIG. 15 is a structural schematic diagram of a power supply circuit of a display apparatus according to an embodiment of the disclosure.

FIG. 15 is a structural schematic diagram of a power supply circuit in a display apparatus according to an embodiment of the disclosure. Here, taking the power supply circuit supplying power to two LED light bars ① and ② as an example, the LLC module 14 has three different LLC secondary windings to supply power to the LED light bars ① and ②, including: a first LLC secondary winding 142, and two second LLC secondary windings 143 and 146. The input terminal a of the first secondary winding 142 is grounded, the output terminal b of the first secondary winding 142 is connected with the voltage adjustment module 15 and the voltage adjustment module 16, the input terminal c of the second LLC secondary winding 143 is connected with the voltage adjustment module 15 and the output terminal d is connected with the LED light bar ①, and the input terminal e of the second LLC secondary winding 146 is connected with the voltage adjustment module 16 and the output terminal f is connected with the LED light bar ②. It can be understood that, when the power supply circuit supplies power to more LED light bars, each LED light bar may be provided with a second secondary winding and a voltage adjustment module, and the connection is similar to that in FIG. 15. The implementations and principle thereof are similar to the above and will not be repeated here.

Then, the voltage adjustment module 15 connected with the LED light bar ① and implemented based on the boost circuit may be configured to adjust the first voltage output from the first LLC secondary winding 142. The adjusted voltage is denoted as a third voltage. The voltage adjustment module 15 may send the third voltage to the input terminal c of the second secondary winding 143. The second LLC secondary winding 143 is used to output a second voltage, and the output terminal d of the second LLC secondary winding 143 sends the sum of the third voltage and the second voltage to the LED light bar ① for power supply. Similarly, the voltage adjustment module 16 connected with the LED light bar ② and implemented based on the boost circuit may be configured to adjust the first voltage output from the first LLC secondary winding 142. The adjusted voltage is denoted as a fourth voltage. The voltage adjustment module 16 may send the fourth voltage to the input terminal e of the second secondary winding 146. The second LLC secondary winding 146 is used to output a fifth voltage, and the output terminal f of the second LLC secondary winding 146 sends the sum of the fourth voltage and the fifth voltage together to the LED light bar ② for power supply.

In this case, the second voltage output from the second LLC secondary winding 143 and the fifth voltage output from the second LLC secondary winding 146 are equivalent to "fixed voltages" that do not change, and the first voltage output from the first LLC secondary winding 142 is equivalent to a "variable voltage" that changes, Therefore, an adjustable variable voltage output is added on the basis of the fixed second voltage, and the fixed voltage and the variable voltage output from the two secondary windings together supply power to the LED light bars. Such power supply form may also be called as "stepped power supply". In particular, each LED light bar may be connected with a separate voltage adjustment module and a separate LLC secondary winding, so that each voltage adjustment module can adjust the voltage of the LED light bar more effectively.

In the power supply circuit of the embodiment shown in FIG. 15, the power supply circuit adopts the LLC module for power supply, and the LLC module has a first secondary winding, a second secondary winding and a third secondary winding. In other implementations, the power supply circuit may also use the first secondary winding and the second secondary windings set in a single flyback structure, and output voltages through the primary winding in the single flyback structure.

Figure 16:
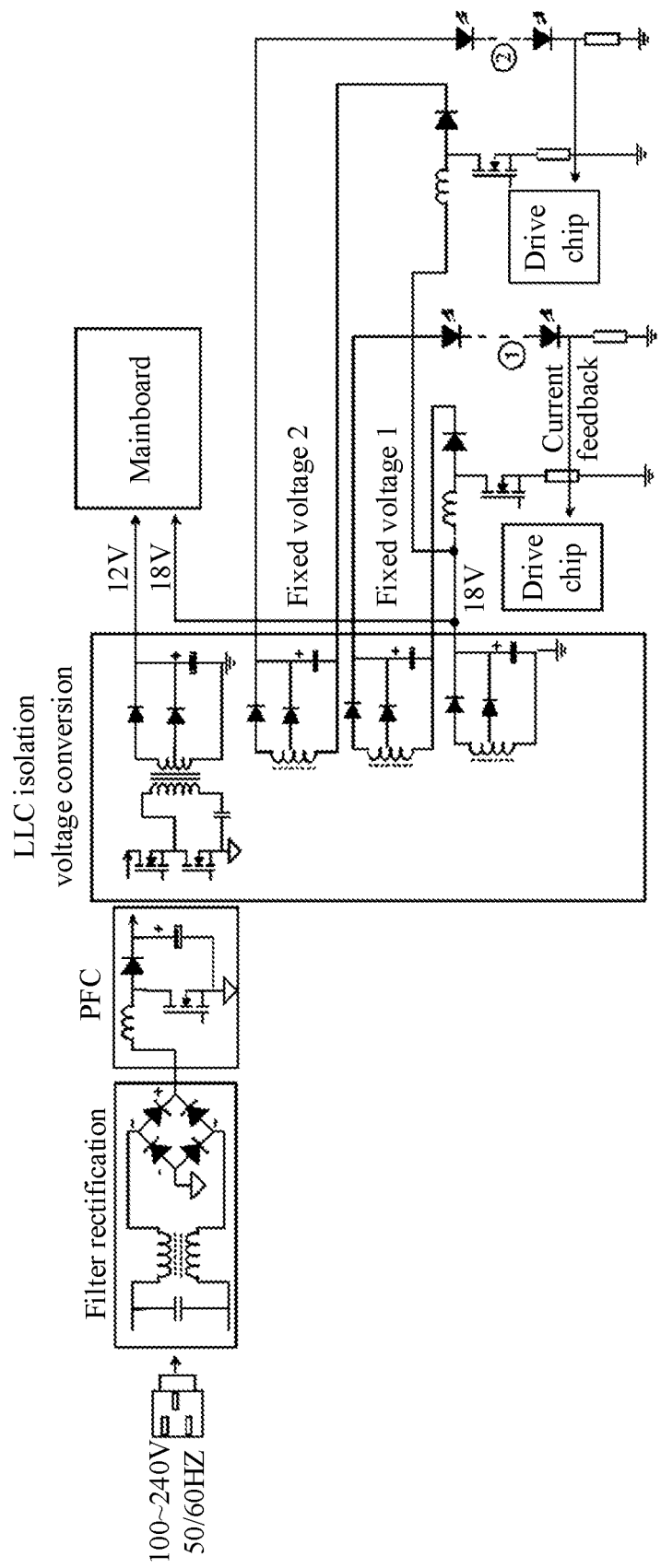
FIG. 16 is a structural schematic diagram of a power supply circuit of a display apparatus according to an embodiment of the disclosure.

FIG. 16 is a structural schematic diagram of a power supply circuit in a display apparatus according to an embodiment of the disclosure. Here, in the power supply circuit shown in FIG. 16, on the basis of the power supply circuit shown in FIG. 15, if the required variation range of the first voltage output from the first LLC secondary winding can be 18V, the secondary winding that provides the voltage 18V to the mainboard may be taken as the first LLC secondary winding, and thus it is not necessary to individually set the first LLC secondary winding in this case. Compared with an embodiment shown in FIG. 15, the complexity of the power supply circuit can be further reduced, thereby reducing the cost. It can be understood that, as shown in FIG. 16, only the voltage 18V of the mainboard is taken as an example. If the required variation range of the first voltage is within 12V, the secondary winding that provides the voltage 12V to the mainboard may be taken as the first LLC secondary winding; or, in other implementations, the secondary winding that provides a certain voltage to other loads may also be taken as the first LLC secondary winding, etc., and the implementation and principle thereof is similar to the above and will not be repeated.

In some embodiments, since the voltage conversion circuits cannot be used in parallel, it is necessary to add windings or diodes in the LLC module to realize stepped power supply, causing structure of the power supply circuit complicate. Therefore, following embodiments provide a display apparatus and a negative-voltage-stepped power supply circuit, so that the power supply circuit only needs to set one LLC secondary winding in the LLC module to provide a negative voltage and combine with another LLC secondary winding to provide a positive first voltage. The two LLC secondary windings may be connected in parallel to provide voltages for the drive components of a plurality of LED light bars connected with a plurality of voltage conversion circuits at the same time, so that the plurality of voltage conversion circuits can be connected with the output of the same LLC secondary winding and connected with the same negative voltage grounding point to realize the parallel connection of the plurality of voltage conversion circuits in the power supply circuit, and the LLC secondary winding simultaneously supplies power to a multiple LED driving circuit. In this case, the plurality of voltage conversion circuits can provide the currents required by the plurality of LED light bars to the LED drive components connected respectively, and do not rely entirely on one secondary winding to provide the whole large current, so that the current output from the secondary winding will not be too large and the stepped power supply can be realized without setting more secondary windings, thereby simplifying the circuit structure of the power supply circuit.

Embodiments of the disclosure will be described in detail below. Several specific embodiments below may be combined with each other, and the same or similar concepts or processes may be omitted in some embodiments.

Figure 17:
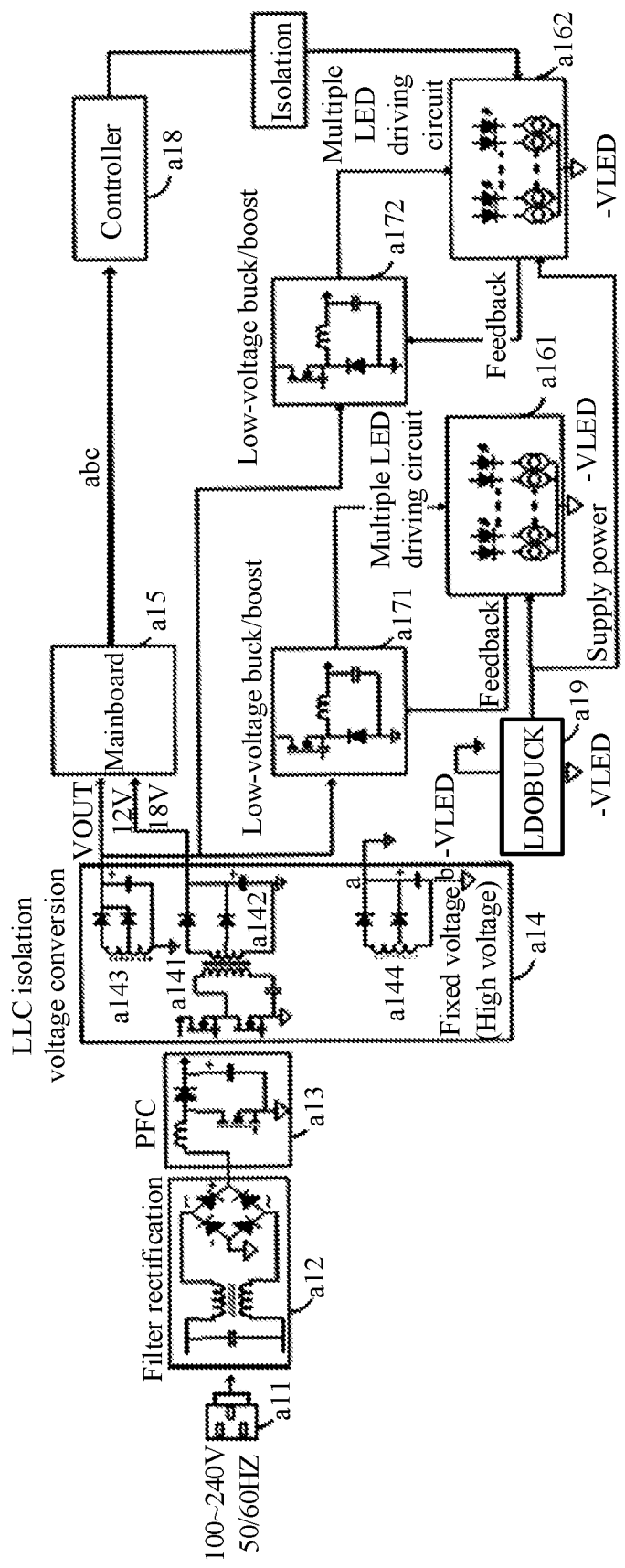
FIG. 17 is a schematic diagram of a display apparatus according to the disclosure.

FIG. 17 is a schematic diagram of a display apparatus according to an embodiment of the disclosure.

The power supply circuit in the display apparatus as shown in FIG. 17 may supply power to a plurality of LED drive components in the display apparatus. In FIG. 17, taking the LED drive components a161 and a162 as an example, each LED drive component may be configured to supply power to a plurality of LED light bars connected with the LED drive component, and a plurality of LED light bars connected with all the LED drive components may be configured to light up the display screen of the display apparatus together.

In the display apparatus shown in FIG. 17, the power supply circuit includes: a plug a11, a filter rectification module a12, a PFC module a13, and an LLC module a14. In other implementations, the power supply circuit may also include some or all of the above modules according to different working requirements. Then, after the electric AC power (100V-240V, 50-60 Hz) obtained by the power supply circuit from the plug a11 is processed by the filter rectification module a12 (rectifier bridge), the PFC module A13 and the LLC module A14 in sequence, the DC power of different voltages is obtained to supply power to the loads. For example, after the LLC module a14 of the power supply circuit receives the DC input voltage sent from the PFC module a13 through the primary winding a141, the secondary winding a143 provides a voltage of 12V to the mainboard a15 according to the voltage of the primary winding a141, and the secondary winding a142 provides a voltage of 18V to the mainboard a15 according to the voltage of the primary winding a141. The above-mentioned voltages of 12V and 18V are only examples, and the secondary winding a142 and the secondary winding a143 may also provide other voltages to the mainboard a15.

In the LLC module a14 of the power supply circuit in this embodiment, the power is supplied simultaneously to a plurality of drive components connected in parallel through two different secondary windings, the two different secondary windings are denoted as a first LLC secondary winding and a second LLC secondary winding. The first LLC secondary winding is used to provide a positive first voltage to a plurality of LED drive components, and the second LLC secondary winding is used to provide a negative second voltage to a plurality of LED drive components.

In some embodiments, the first LLC secondary winding that provides the positive first voltage may be the secondary winding a143 (the first voltage is 12V) or the secondary winding a142 (the first voltage is 18V). In the example shown in FIG. 17, taking the first LLC secondary winding as the secondary winding a143 as an example, the positive electrode of the first LLC secondary winding is connected with the positive electrodes of the plurality of LED drive components respectively, that is, the positive electrode of the first LLC secondary winding a143 is simultaneously connected with the positive electrode of the LED drive component a161 and the positive electrode of the LED drive component a162, and the negative electrode of the first LLC secondary winding a143 is grounded, that is, the first LLC secondary winding takes the reference ground as a reference level.

The winding that provides the negative second voltage may be the second LLC secondary winding a144 in the LLC module a14. The positive electrode a of the second LLC secondary winding is grounded, and the negative electrode b of the second LLC secondary winding is connected with the negative electrodes of the plurality of LED drive components respectively, that is, the negative electrode of the second LLC secondary winding is simultaneously connected with the negative electrode of the LED drive component a161 and the negative electrode of the LED drive component a162. Since the second LLC secondary winding a144 may be used to convert an input voltage of the LLC primary winding a141 into the second voltage, the negative electrode b of the second LLC secondary winding a144 is equivalent to providing the negative second voltage in this case.

Meanwhile, in an embodiment shown in FIG. 17, the power supply circuit further includes a plurality of voltage adjustment modules, each LED drive component is connected with a corresponding voltage adjustment module, each voltage adjustment module may be configured to adjust the voltage output to the LED drive component, and the voltage adjustment module may be implemented by a buck or boost structure or may be a DC-DC chip. For example, the first LLC secondary winding of the LLC module a14 is connected with the LED drive component a161 through the voltage adjustment module a171, and is connected with the LED drive component a162 through the voltage adjustment module 172.

Combined with the first LLC secondary winding a143 and the second LLC secondary winding a144 of the LLC module a14 in the above power supply circuit, the LED drive component a161 is taken as an example for illustration. When the primary winding a141 of the LLC module a14 receives an input voltage sent from the PFC module a13, the first LLC secondary winding a143 converts the input voltage into a first voltage (denoted as VOUT) and outputs the first voltage to the positive electrode of the LED drive component a161 through the voltage adjustment module a171, and the second LLC secondary winding a144 converts the input voltage into a second voltage (denoted as –VLED) and outputs the second voltage to the negative electrode of the LED drive component a161. In this case, for the LED drive component a161, it amounts to using –VLED of the negative electrode as the reference ground level, and the voltage between both sides of the LED drive component a161 is the sum of the absolute values of the first voltage VOUT and the second voltage –VLED. The second voltage –VLED output from the second LLC secondary winding a144 will not change and is denoted as "fixed voltage", and the first voltage output from the first LLC secondary winding a143 can be adjusted by the voltage adjustment module a171 and is denoted as "variable voltage", so the fixed voltage and the variable voltage output from the two secondary windings collaborates to supply power to the plurality of LED light bars, to achieve stepped power supply.

In some embodiments, the first voltage VOUT output from the first LLC secondary winding a143 is less than the absolute value of the second voltage –VLED output from the second LLC secondary winding.

The LED drive component a161 may further determine an operating voltage of a LED light bar connected, and send a feedback signal to the voltage adjustment module a171 when the operating voltage changes, so that the voltage adjustment module a171 adjusts the voltage provided to the LED drive component a161 according to the feedback signal, to enable the LED drive component a161 to drive the LED light bar to maintain its rated normal operating current.

The power supply circuit provided in this embodiment can simultaneously supply power to a plurality of voltage conversion circuits and LED drive components connected in parallel through the positive first voltage provided by the first LLC secondary winding and the negative second voltage provided by the second LLC secondary winding, so that the plurality of voltage conversion circuits may be connected with the positive output terminal of the first LLC secondary winding and be connected with one terminal of the second LLC secondary winding for providing –VLED, to realize the parallel connection of the plurality of voltage conversion circuits in the power supply circuit, and the LLC secondary winding supplies power to a multiple LED driving circuit simultaneously. In this case, the plurality of voltage conversion circuits may provide the currents required by the plurality of LED light bars to the LED drive components connected respectively. Compared with an embodiment shown in FIG. 5, the current output from each secondary winding will not be too large, thereby reducing the cost of the voltage conversion circuits. Compared with an embodiment shown in FIG. 6, there is no need to set more secondary windings, and all the voltage conversion circuits can share the second LLC secondary winding. Therefore, compared with embodiments shown in FIG. 5 and FIG. 6, the stepped power supply through the above circuit structure allows for lower cost and lower complexity.

In some embodiments and in an embodiment shown in FIG. 17, for each LED drive component and the voltage adjustment module connected with the LED drive component, the reference ground level of the LED drive component is −VLED, and is different from the reference ground directly connected with the voltage adjustment module, so that the feedback signal generated by the constant-current control chip in the LED drive component cannot be directly sent to the voltage adjustment module. Therefore, the disclosure further provides a feedback circuit, the feedback circuit is configured between each LED drive component and the voltage adjustment module in an embodiment as shown in FIG. 17 and is configured to receive a first feedback signal output from the LED drive component, convert the first feedback signal to obtain a second feedback signal corresponding to the voltage adjustment module, and finally send the second feedback signal to the voltage adjustment module.

Figure 18:
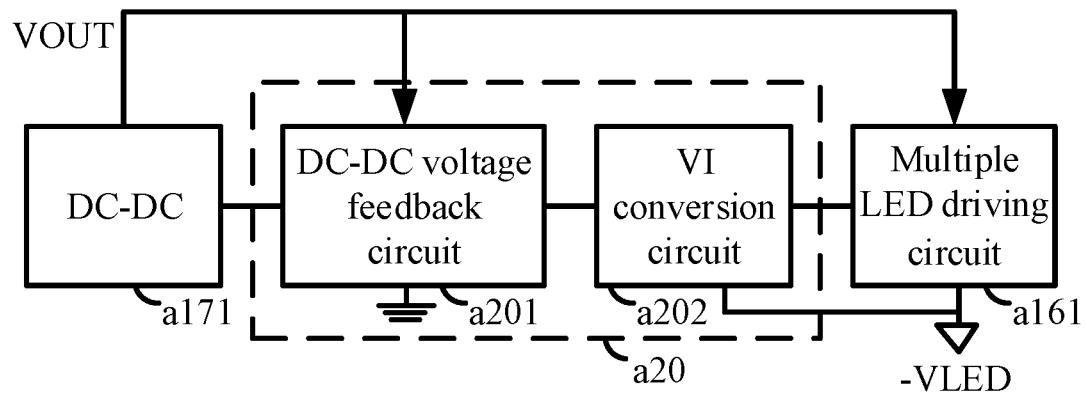
FIG. 18 is a structural schematic diagram of an embodiment of a feedback circuit according to the disclosure.

FIG. 18 is a structural schematic diagram of a feedback circuit according to an embodiment of the disclosure. In an embodiment shown in FIG. 18, a feedback circuit a20 configured between the LED drive component a161 and the voltage adjustment module a171 in the power supply circuit shown in FIG. 7 is taken as an example. The feedback circuit a20 includes: a VI conversion circuit and a DC-DC voltage feedback circuit. The VI conversion circuit is configured to convert a first feedback signal in the form of voltage signal sent from the LED drive component a161 into a second feedback signal in the form of current signal corresponding to the DC-DC voltage feedback circuit, realizing level conversion. The DC-DC voltage feedback circuit is configured to receive the second feedback signal and send the second feedback signal to the voltage adjustment module a171.

Figure 19:
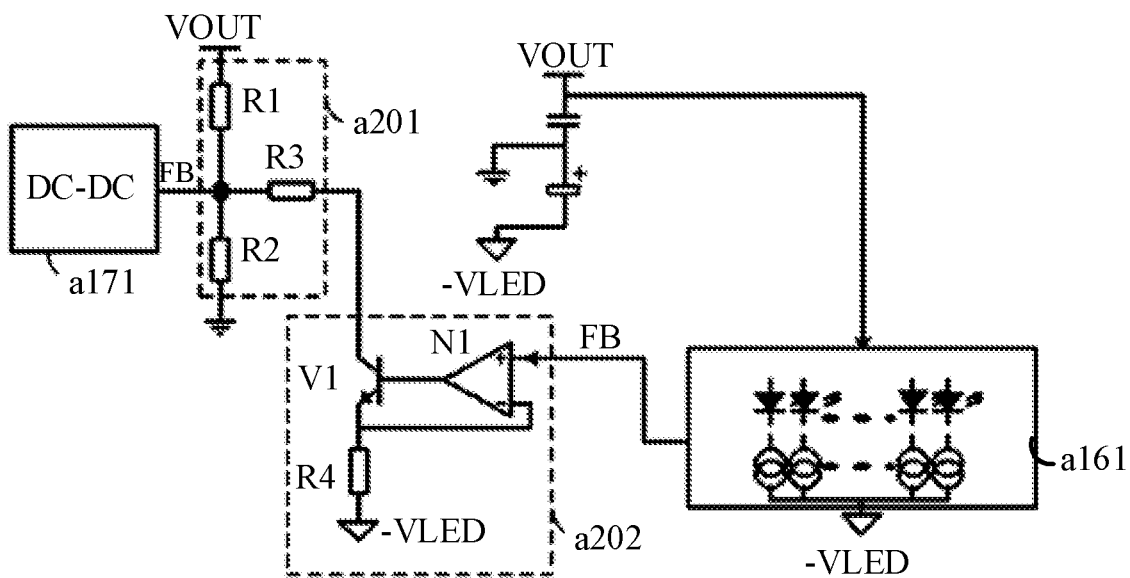
FIG. 19 is a schematic diagram of a circuit structure of the feedback circuit according to the disclosure.

FIG. 19 is a schematic diagram of a circuit structure of the feedback circuit according to an embodiment of the disclosure, and shows a specific circuit implementation of the structure shown in FIG. 18. The VI conversion circuit includes: an operational amplifier N1, a transistor VI and a first resistor R4. The first input terminal (which may be the positive electrode) of the operational amplifier N1 is connected with the LED drive component a161, the second input terminal (which may be the negative electrode) of the operational amplifier N1 is connected with the first terminal of the transistor V1 and the first terminal of the first resistor R4, the output terminal of the operational amplifier N1 is connected with the control terminal of the transistor V1, and the second terminal of the first resistor R4 is connected with the negative electrode of the second LLC secondary winding, so that the reference ground level of the VI conversion circuit is −VLED on the negative electrode of the second LLC secondary winding.

The DC-DC feedback circuit includes: a second resistor R1, a third resistor R2 and a fourth resistor R3. The first terminal of the second resistor R1 is connected with the output terminal VOUT of the voltage adjustment module a171, the second terminal of the second resistor R1 is connected with the first terminal of the third resistor R2, the first terminal of the fourth resistor R3 and the feedback input terminal of the voltage adjustment module a171, the second terminal of the fourth resistor R3 is connected with the second terminal of the transistor V1, and the second terminal of the third resistor R2 is grounded so that the DC-DC feedback circuit is connected with the reference ground.

Then, when the operational amplifier N1 receives the first feedback signal FB sent from the LED drive component a161, the operational amplifier N1 controls V1 to turn on, so that the DC-DC voltage feedback circuit generates a current signal from VOUT to the reference ground and flowing through the second resistor R1 and the fourth resistor R3. The current signal at the second terminal of the second resistor R1 may be used as a second feedback signal and input to the feedback input terminal of the voltage adjustment module a171, so that the voltage adjustment module a171 adjusts the voltage VOUT output to the LED drive component a161 after receiving the second feedback signal.

However, in embodiments shown in FIG. 18-FIG. 19, the first LLC secondary winding that provides the fixed voltage in the LLC module has the voltage fluctuation of several kHz, and the feedback speed is relatively slow when completely relying on the constant-current control chip in the LED drive component to send the feedback signal, which may cause the high-frequency fluctuation in the voltage supplied to the LED light bar and thus cause the fluctuation in the operating current of the LED light bar.

Figure 20:
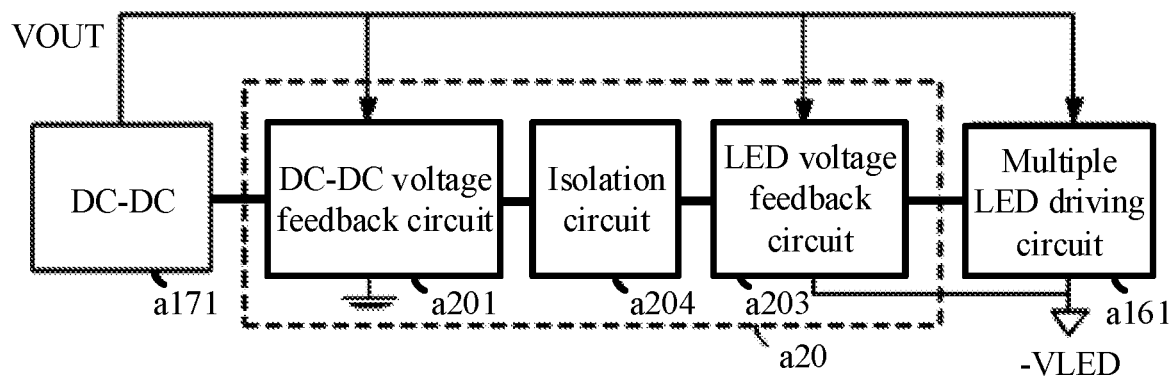
FIG. 20 is a structural schematic diagram of another embodiment of the feedback circuit according to the disclosure.

Therefore, in view of voltage fluctuation of the secondary winding, the disclosure further provides another feedback circuit. FIG. 20 is a structural schematic diagram of another feedback circuit according to an embodiment of the disclosure. The feedback circuit shown in FIG. 20 includes: an LED voltage feedback circuit a203, an isolation circuit a204 and a DC-DC voltage feedback circuit a201. The DC-DC voltage feedback circuit a201 is connected with the reference ground, and the reference ground of the LED voltage feedback circuit remains the same as the LED drive component a161 and both of the LED voltage feedback circuit and the LED drive component a161 are connected with the negative electrode of the second LLC secondary winding, so that the reference ground level is −VLED. The isolation circuit a204 is configured to electrically isolate the LED voltage feedback circuit a203 and the DC-DC voltage feedback circuit a201 on both sides of the isolation circuit a204. The LED voltage feedback circuit is configured to generate a first intermediate signal according to the first voltage VOUT and the first feedback signal and send the first intermediate signal to the isolation circuit a204. The isolation circuit converts the first intermediate signal of the LED drive component a161 into a second intermediate signal and outputs the second intermediate signal to the DC-DC voltage feedback circuit a201, so that the DC-DC feedback circuit generates a second feedback signal according to the second intermediate signal and send the second feedback signal to the voltage adjustment module, which can also solve the problem of different reference ground levels of the circuits on both sides.

Figure 21:
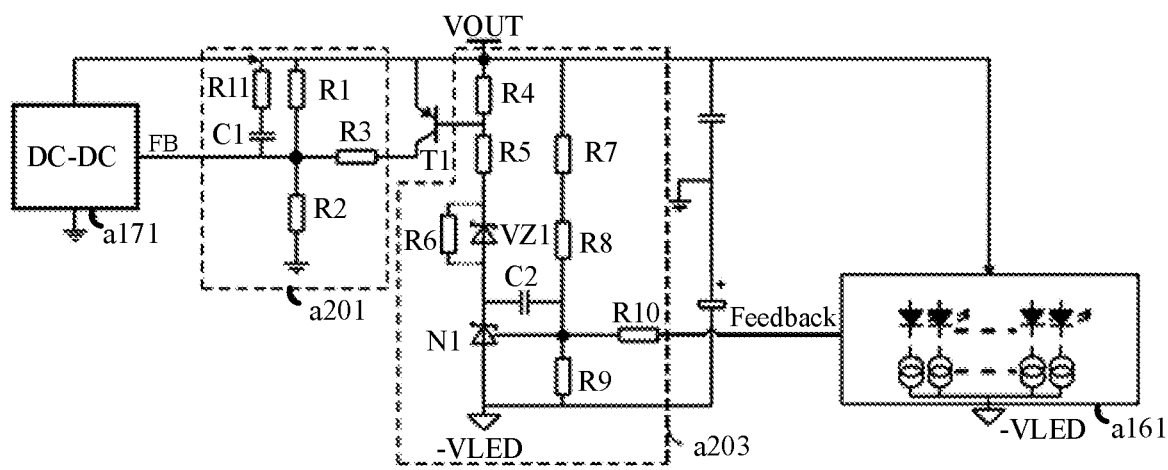
FIG. 21 is a schematic diagram of a circuit structure of the feedback circuit according to an embodiment of the disclosure.

FIG. 21 is a schematic diagram of a circuit structure of the feedback circuit according to an embodiment of the disclosure, and shows a specific circuit implementation of the structure shown in FIG. 20. The isolation circuit a204 may be a switch transistor T1, the switch transistor T1 may be a transistor, an MOS transistor, etc. The first terminal of the switch transistor T1 is connected with the voltage output terminal VOUT of the voltage adjustment module a171, the second terminal of the switch transistor T1 is connected with the DC-DC voltage feedback circuit a201, and the control terminal of the switch transistor T1 is connected with the LED voltage feedback circuit a203, so that the switch transistor T1 can achieve the isolation by turning on or turning off the transmission signal under control of the LED voltage feedback circuit a203.

The DC-DC voltage feedback circuit a201 includes: a second resistor R1, a third resistor R2 and a fourth resistor R3. The first terminal of the second resistor R1 is connected with the output terminal of the voltage adjustment module a171, the second terminal of the second resistor R1 is connected with the first terminal of the third resistor R2, the first terminal of the fourth resistor R3 and the feedback input terminal of the voltage adjustment module a171, the second terminal of the fourth resistor R3 is connected with the second terminal of the switch transistor T1; and the second terminal of the third resistor R2 is grounded so that the DC-DC feedback circuit a201 is connected with the reference ground. Here, the DC-DC voltage feedback circuit a201 can realize the feedback to VOUT independently, and then the resistance value of the second resistor R1 should be set larger so that the DC-DC output voltage can reach the set maximum voltage output value, and the fourth resistor R3 may adjust the minimum value of the output voltage, or the resistance value of the fourth resistor R3 may also be 0 ohm.

In some embodiments, the DC-DC voltage feedback circuit a201 shown in FIG. 21 may further include: a feedforward circuit configured to perform feedforward compensation on the entire DC-DC loop. The feedforward circuit includes a fifth resistor R11 and a second capacitor C1. The first terminal of the fifth resistor R11 is connected with the voltage output terminal VOUT of the voltage adjustment module a171, and the second terminal of the fifth resistor R11 is connected with the feedback input terminal of the voltage adjustment module a171 through the second capacitor C1.

The LED voltage feedback circuit a203 includes: a reference voltage source N1, a first voltage dividing resistor (R7 and R8 are taken as an example in FIG. 21, which may be one resistor), a second voltage dividing resistor R9, a bias resistor R4 and a current limiting resistor R5. The first terminal R7 of the first voltage dividing resistor is connected with the output terminal VOUT of the voltage adjustment module a171, the second terminal R8 of the first voltage dividing resistor is connected with the first terminal of the second voltage dividing resistor R9 and the control terminal of the reference voltage source N1, the first terminal of the reference voltage source N1 is connected with the output terminal VOUT of the voltage adjustment module a171 in sequence through the first and second terminals of the current limiting resistor R5 and the first and second terminals of the bias resistor R4, the first terminal of the bias resistor R4 and the second terminal of the current limiting resistor R5 are connected with the control terminal of the switch transistor T1, and the second terminal of the reference voltage source N1 and the second terminal of the second voltage dividing resistor R9 are respectively connected with the negative electrode of the second LLC secondary winding, so that the reference ground level of the LED voltage feedback circuit a203 is −VLED at the negative electrode of the second LLC secondary winding.

Here, the reference voltage source N1 may be TL431. The reference voltage source N1, the first voltage dividing resistor (R7 and R8) and the second voltage dividing resistor R9 in the LED voltage feedback circuit a203 collaborates to realize feedback. When VOUT changes, VOUT controls the turn-on and turn-off of the reference voltage source N1 after the voltage division of the first voltage dividing resistor and the second voltage dividing resistor. Meanwhile, the first feedback signal generated by the constant-current control chip in the LED drive component a161 may also be directly sent to the control terminal of the reference voltage source N1 through the resistor R10. The bias resistor R4 is configured to provide the bias current of the reference voltage source N1, and the current limiting resistor R5 is configured to limit the current. When the overall voltage value of the LED voltage feedback circuit a203 is relatively large, a voltage regulator circuit may be added between the output terminal VOUT of the voltage adjustment module a171 and the reference voltage sources N1, for example, the voltage regulator circuit includes a voltage regulator diode VZ1. The voltage regulator circuit may be configured to protect the reference voltage source N1.

In the above circuit structure shown in FIG. 21, the LED voltage feedback circuit can perform the overall voltage feedback with the sum of the overall voltages (VOUT and VLED), to solve the influence of the voltage fluctuation of the first LLC secondary winding with the fixed voltage on the voltage and operating current of the LED light bar through the adjustment of the bandwidth output of the reference voltage source N1 in the LED feedback circuit.

Figure 22:
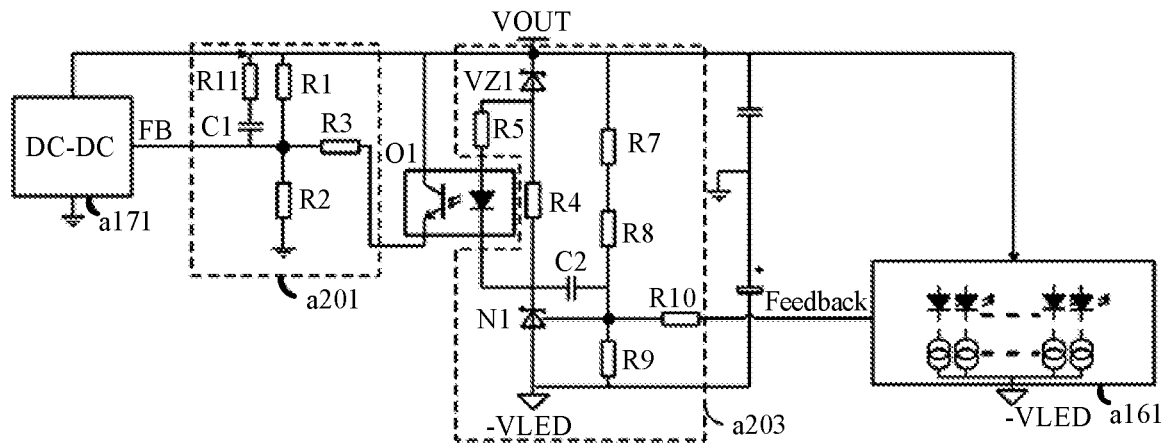
FIG. 22 is a schematic diagram of another circuit structure of the feedback circuit according to an embodiment of the disclosure.

FIG. 22 is a schematic diagram of another circuit structure of the feedback circuit according to an embodiment of the disclosure, and shows another specific circuit implementation of the structure shown in FIG. 20. The structure shown in FIG. 22 is similar to that shown in FIG. 21, and the difference lies in the isolation circuit where the switch transistor T1 is replaced with the optocoupler O1, so the connection relationship in the LED voltage feedback circuit needs to be adjusted accordingly. Here, the first terminal of the reference voltage source N1 is connected with the output terminal VOUT of the voltage adjustment module a171 through the bias resistor R4, the first terminal of the current limiting resistor R5 is connected with the output terminal VOUT of the voltage adjustment module a171, the second terminal of the current limiting resistor R5 is connected with the first input terminal of the optocoupler O1, the first terminal R8 of the first voltage dividing resistor is connected with the second input terminal of the optocoupler O1 through the first capacitor C2, the first output terminal of the optocoupler O1 is connected with the output terminal VOUT of the voltage adjustment module a171, and the second output terminal of the optocoupler O1 is connected with the fourth resistor R3 in the DC-DC voltage feedback circuit a201.

The display apparatus generally includes a backlight module and a panel. The backlight module may have a power source, a mainboard, a light-emitting device, and a light-emitting driving device corresponding to the light-emitting device. The power source may supply power to the mainboard and the light-emitting driving device, so that the mainboard receives an image signal transmitted from an external server or optical fiber, processes the image signal through a controller on the mainboard, and transmits a control signal to the light-emitting driving device, so that the light-emitting driving device parses the control signal after receiving the control signal and drives the lamp area according to the information on the working state of the lamp area carried in the control signal. However, when the backlight module increases or when the display brightness of the display panel needs to be increased, the power required by the backlight module increases, but the above method cannot meet the requirement of the backlight module.

Figure 23:
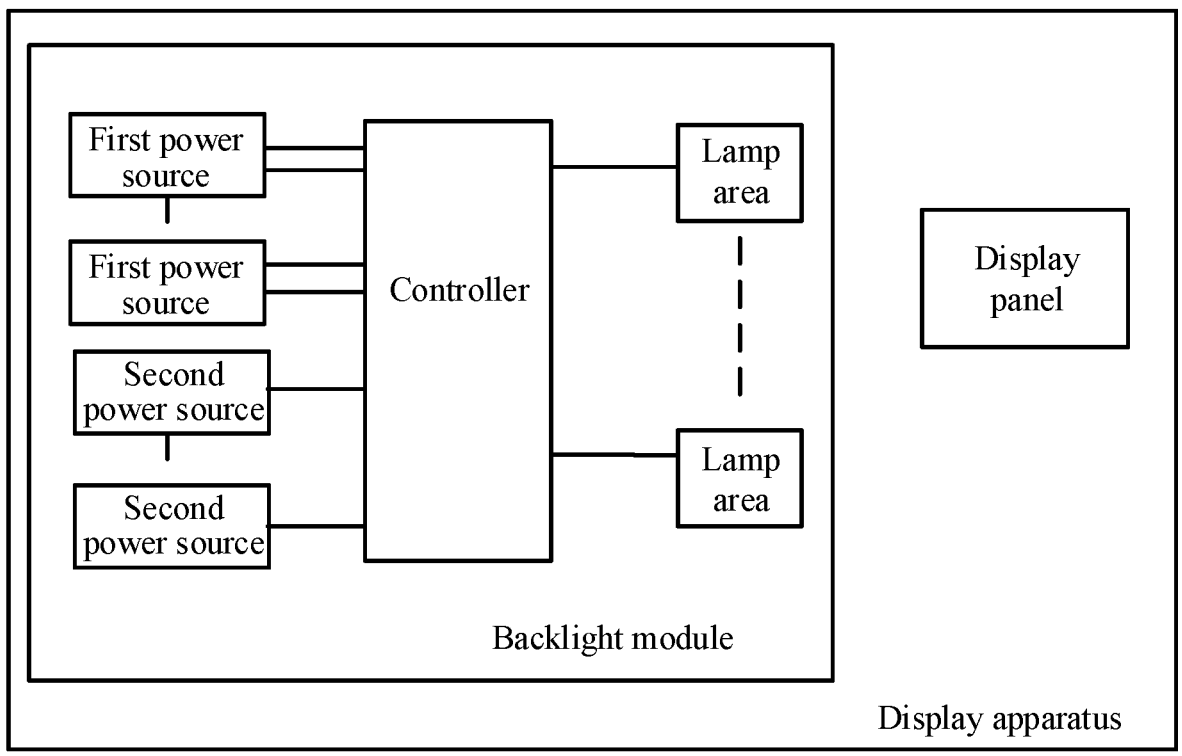
FIG. 23 is a structural schematic diagram of a display apparatus according to an embodiment of the disclosure.

FIG. 23 is a structural schematic diagram of a display apparatus according to an embodiment of the disclosure. As shown in FIG. 23, the display apparatus includes a backlight module and a display panel. The backlight module is configured with a plurality of power sources, a controller, and lamp areas corresponding to the plurality of power sources. There are two types of power sources in the plurality of power sources. One type is a first power source configured to provide a positive power supply signal to the controller and drive a lamp area corresponding to the first power source to work. The other type is a second power source configured to drive a lamp area corresponding to the second power source to work. It should be noted that the corresponding relationship between power sources and lamp areas in this embodiment may be that one power source corresponds to a plurality of lamp areas or one power source corresponds to one lamp area; and the number of the first power sources or second power sources may be one or more, which is not specifically limited.

In addition, the lamp areas in an embodiment of the disclosure emit light by receiving driving signals from the controller. The driving signals from the controller are generated by negative voltage driving. The plurality of power sources are configured to output negative power supply signals and negative reference signals, and the driving signals are generated by the controller based on the control signal, the received negative power supply signals and negative reference signals provided by the power sources.

Furthermore, the controller in this embodiment may further be configured to control the first power source to work and the second power source to turn off in the standby mode, and control the first power source and the second power source to work in the non-standby mode.

Figure 24:
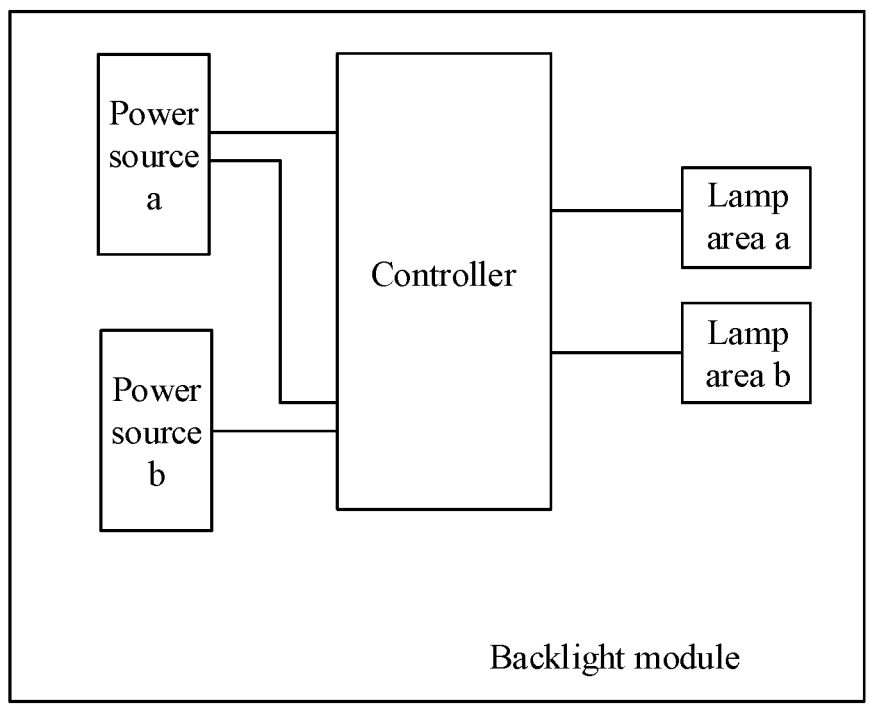
FIG. 24 is a structural schematic diagram of a backlight module according to an embodiment of the disclosure.

In an example, FIG. 24 is a structural schematic diagram of a backlight module according to an embodiment of the disclosure. As shown in FIG. 24, only two power sources and two lamp areas are taken as an example in FIG. 24, and one power source corresponds to one lamp area, where a power source a corresponds to a lamp area a, and a power source b corresponds to a lamp area b. The power source a is the first power source mentioned in FIG. 23 and is configured to provide a positive power supply signal to the controller, and the power supply a further provides a negative reference signal and a negative power supply signal to the controller, so that the controller drives the lamp area a to emit light based on the negative reference signal and the negative power supply signal provided by the power source a and a control signal generated by the controller through an external command. The power source b is the second power source mentioned in FIG. 23 and provides a negative reference signal and a negative power supply signal to the controller, so that the controller drives the lamp area b to emit light based on the negative reference signal and the negative power supply signal provided by the power source b and a control signal generated by the controller through an external command.

In this embodiment, a plurality of power sources drive the lamp areas corresponding to the power sources through the controller. The above apparatus can avoid the problem that the existing apparatus cannot meet the power consumption requirement of the lamp areas due to the continuous increase of the power required by the continuous increase of lamp areas and thus the display interface of the display apparatus is faulty and affects user's use.

Figure 25:
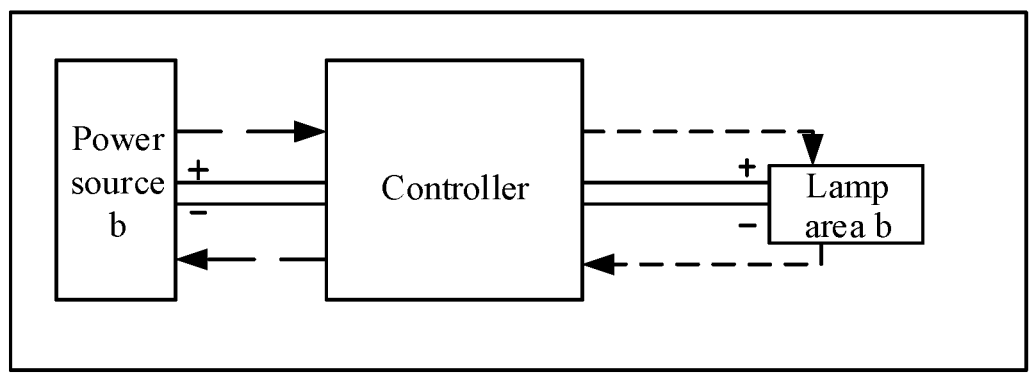
FIG. 25 is a schematic diagram of a current flow of a lamp area according to an embodiment of the disclosure.

FIG. 25 is a schematic diagram of a current flow of a lamp area according to an embodiment of the disclosure. The driving mode of the controller is the existing positive-voltage driving mode. In FIG. 25, taking the power source b and the lamp area b as an example, the current of the lamp area b at this time starts from the power source b corresponding to the lamp area b; passes through the controller, the positive terminal of the lamp area b, the negative terminal of the lamp area b and the controller; and returns to the corresponding power source b, forming a current loop. The power supply signal provided by the power source b for the light-emitting drive module is a positive electrical signal. FIG. 25 only shows a schematic diagram of the current flow between any one of a plurality of power sources and its corresponding lamp area. The current flow loops between other power sources and their corresponding lamp areas are the same as that, and the dotted line in FIG. 25 only represents the current flow and does not represent the actual connection line.

In an embodiment shown in FIG. 23, the mode where the controller drives the lamp areas to work is the negative-voltage driving mode. In this mode, the positive terminal of each lamp area is grounded, and the negative terminal of each lamp area is connected with the light-emitting drive module. And the controller may be connected with the first power source in a plurality of power sources, and the first power source provides positive power for the controller. Furthermore, there is a connection relationship between the controller and each of the plurality of power sources, and in this case, both the first power source and the second power source in the plurality of power sources provide negative power supply signals and negative reference signals to the controller. In an example, the display apparatus may further include a backplane, and the positive terminal of each lamp area may also be connected with the ground through the backplane after being connected with the backplane. The light emitting devices in the lamp area may be electrically connected with the backplane by screws.

Figure 26:
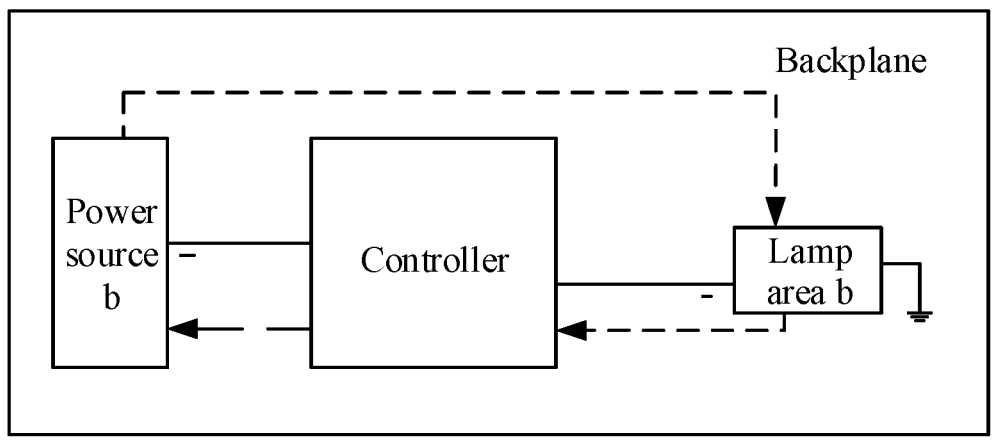
FIG. 26 is a schematic diagram of another current flow of a lamp area according to an embodiment of the disclosure.

FIG. 26 is a schematic diagram of another current flow of a lamp area according to an embodiment of the disclosure. The driving mode where the controller drives the lamp area is the negative-voltage driving mode. In FIG. 26, taking the power source b and the lamp area b as an example, the current of the lamp area b at this time starts from the power source b corresponding to the lamp area b; passes through the backplane, the positive terminal of the lamp area b, the negative terminal of the lamp area b and the controller; and returns to the corresponding power source b. Also, the power supply signal provided by the power source b for the light-emitting drive module is a negative power supply signal in this process. FIG. 26 only shows a schematic diagram of the current flow between any one of a plurality of power sources and its corresponding lamp area in the negative-voltage driving mode. The current flow loops between other power sources and their corresponding lamp areas are the same as that, and the dotted line in FIG. 26 only represents the current flow and does not represent the actual connection line.

In an embodiment of the disclosure, the driving mode of the lamp area in the display apparatus is the negative-voltage driving mode. Compared with the display apparatus in the positive-voltage driving mode, in the negative-voltage driving mode, the positive terminal of the lamp area may be connected onto the backplane by a screw or directly grounded. The above-mentioned connection relation can reduce the connection cables between the lamp area and the controller as well as the number of connection cables, thereby reducing the area of the circuit board occupied by the controller.

Figure 27:
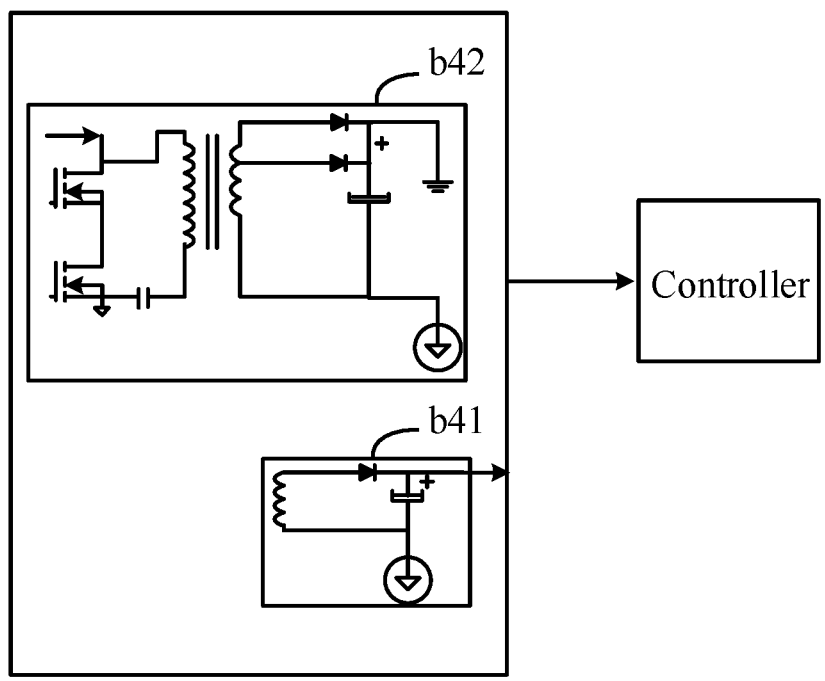
FIG. 27 is a structural schematic diagram of a first power source according to an embodiment of the disclosure.

In some embodiments, in order to output the negative power supply signal and the negative reference signal to the controller, an embodiment of the disclosure provide a structure of a power source. FIG. 27 is a structural schematic diagram of a first power source according to an embodiment of the disclosure. As shown in FIG. 27, the power source structure of the disclosure can apply to the second power source in FIG. 23. The second power source includes: a coil winding module b41 and a first isolation voltage conversion module b42.

Here, the coil winding module b41 is coupled to a primary coil in the first isolation voltage conversion module b42, and the coil winding module b41 is connected with the lamp area through the controller. The first isolation voltage conversion module b42 may be configured to receive a power supply signal, output a negative reference signal after performing voltage conversion on the received power supply signal, and provide the negative reference signal to the controller and the coil winding module b41. The coil winding module b41 couples to obtain a negative power supply signal after receiving the power supply signal and the negative reference signal generated by the first isolation voltage conversion module b42, and provide the negative power supply signal to the controller. The negative power supply signal and the negative reference signal are used to be provided to the controller to generate a driving signal.

In an example, the power supply signal received by the first isolation voltage conversion module b42 is commercial power.

Figure 28:
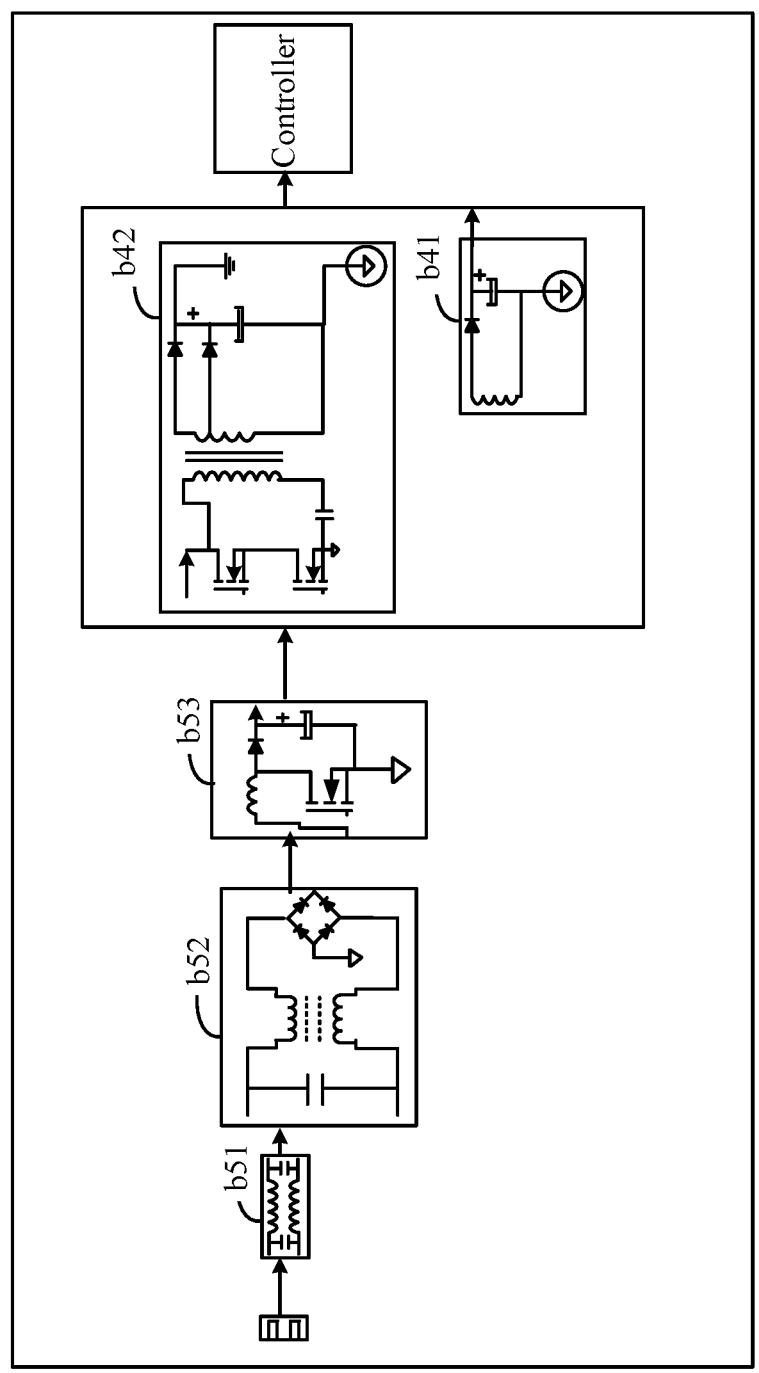
FIG. 28 is a structural schematic diagram of a second power source according to an embodiment of the disclosure.

In an example, the power supply signal received by the first isolation voltage conversion module b42 is a power supply signal after processing on the commercial power. When the commercial power (100V-240V, 50-60 Hz) is processed, the processing flow includes: filtering, filter rectification, and power factor correction. That is, the second power source may further include a filter module, a filter rectification module, a power factor correction module, and other modules for processing the commercial power. FIG. 28 is a structural schematic diagram of a second power source according to an embodiment of the disclosure. As shown in FIG. 28, the filter module b51 filters the received commercial power, such as high-frequency filtering, etc. In some embodiments, the filter module b51 may not be provided.

Afterwards, the filter rectification module b52 performs filter rectification on the filtered signal, and converts the received AC wave signal into a full-wave signal. After being processed by the filter rectification module b52, the phase of the power supply signal generated by the filter rectification module b52 is adjusted by the power factor correction module b53, so that the phases of the current and the voltage are the same, and the power factor of the power source can be effectively improved. In some embodiments, the power factor correction module b53 may not be provided.

After that, the power factor correction module b53 provides the corrected power supply signal to the coil winding module b41 and the first isolation voltage conversion module b42.

With the power source structure in the above embodiment, the negative power supply signal and the negative reference signal may be output to the controller by adding the coil winding b41, so that the controller can drive the lamp area to work by negative voltage driving.

Figure 29:
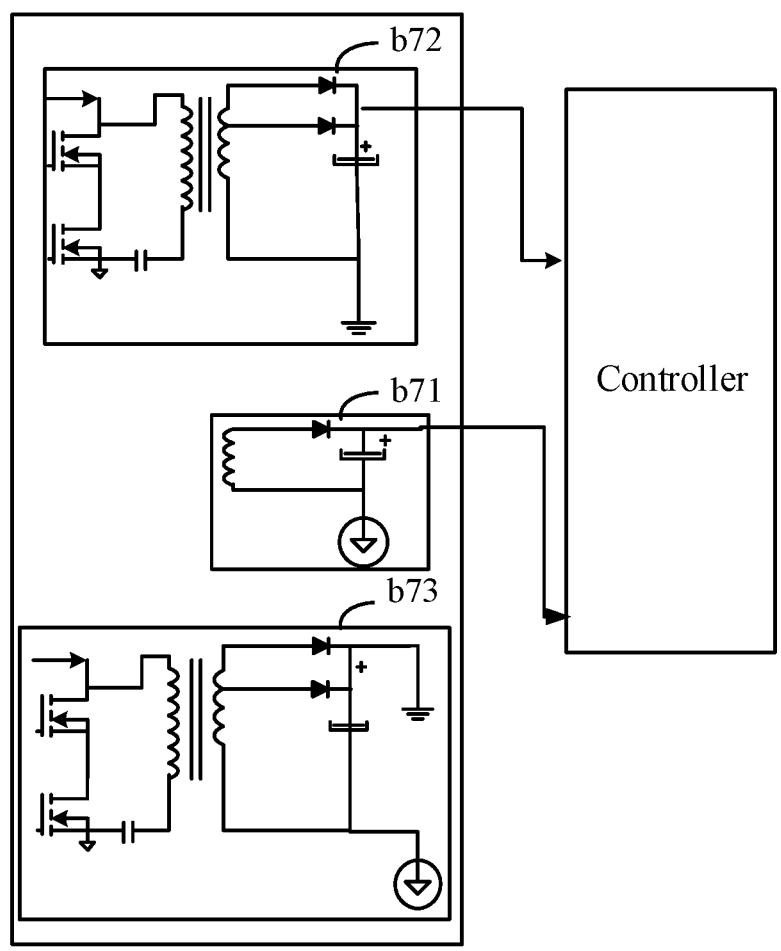
FIG. 29 is a structural schematic diagram of a third power source according to an embodiment of the disclosure.

In some embodiments, in order to output the negative power supply signal and the negative reference signal to the controller, an embodiment of the disclosure provide a structure of a third power source. FIG. 29 is a structural schematic diagram of a third power source according to an embodiment of the disclosure. As shown in FIG. 29, the power source structure of the disclosure can apply to the first power source in FIG. 23. Here, the first power source includes: a coil winding module b71, a second isolation voltage conversion module b72 and a third isolation voltage conversion module b73.

The second isolation voltage conversion module b72 is configured to receive a power supply signal and perform voltage conversion on the power supply signal, so that the second isolation voltage conversion module b72 generates a positive power supply signal and provides the positive power supply signal to the controller connected with the output terminal of the second isolation voltage conversion module b72.

The third isolation voltage conversion module b73 is configured to receive a power supply signal and perform voltage conversion on the power supply signal, so that the third isolation voltage conversion module b73 generates a negative reference signal.

The coil winding module b71 is coupled to the second isolation voltage conversion module b72, and the coil winding module b71 is connected with the controller. The coil winding module b71 is configured to receive the power supply signal and the negative reference signal generated by the third isolation voltage conversion module b73, and couple to obtain a negative power supply signal. The negative power supply signal and the negative reference signal are both used to be provided to the controller to generate a driving signal.

The power supply signal in this embodiment may be an electric AC signal or a signal after processing the electric AC signal. The specific processing flow of the electric AC signal may refer to FIG. 28.

Through the power source structure provided in the above embodiment, the negative power supply signal and the negative reference signal can be output to the controller, so that the controller can drive the lamp area to work through negative voltage driving, and the controller can also be configured with the positive power supply signal to make the controller work.

In the above-mentioned embodiments shown in FIGS. 27 and 29, the method of providing the negative power supply signal for the light-emitting drive module by coupling the coil winding with the isolation voltage conversion module in the negative-voltage driving mode is provided. In this power supply mode, the power circuit structure in the display apparatus has two different connection approaches as shown in FIGS. 27 and 29.

Figure 30:
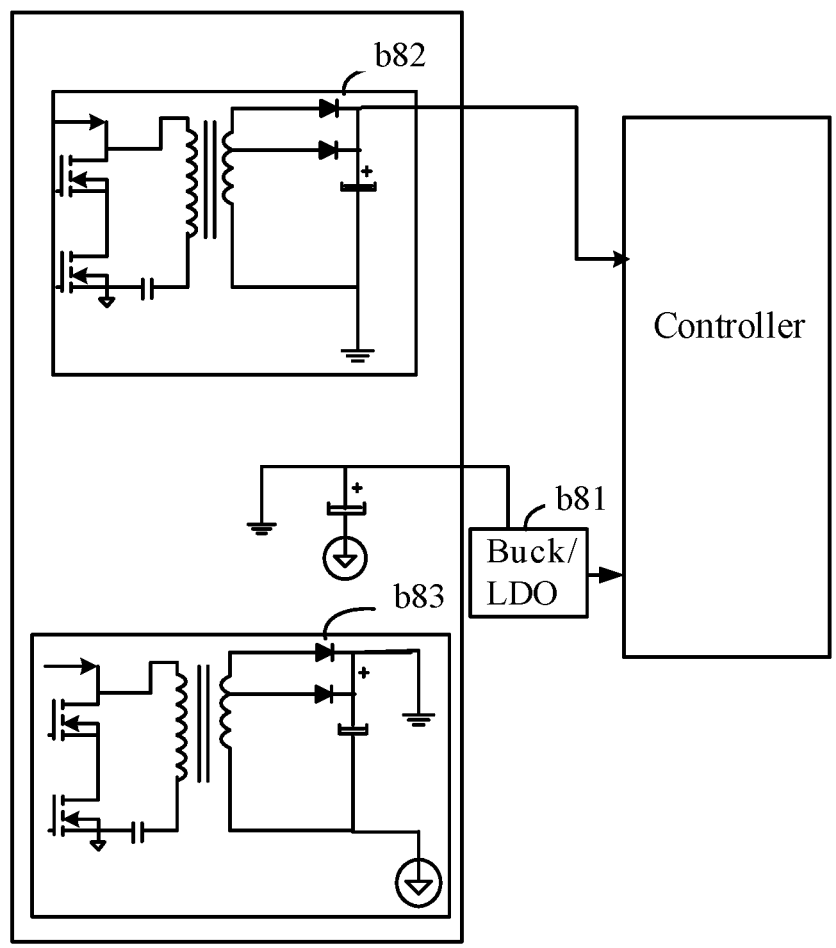
FIG. 30 is a structural schematic diagram of a fourth power source according to an embodiment of the disclosure.

In some embodiments, in order to output the negative power supply signal and the negative reference signal to the controller, an embodiment of the disclosure provide a structure of a fourth power source. FIG. 30 is a structural schematic diagram of a fourth power source according to an embodiment of the disclosure. As shown in FIG. 30, the power source structure of the disclosure can apply to the first power source in FIG. 23. Here, the first power source includes: a buck module b81, a first voltage conversion module b82 and a second voltage conversion module b83.

The first voltage conversion module b82 is configured to perform voltage conversion on a power supply signal received to obtain a positive power supply signal, and sends the positive power supply signal to a controller connected with an output terminal of the first voltage conversion module b82 to supply power to the controller.

The second voltage conversion module b83 is configured to perform voltage conversion on a power supply signal received to obtain a negative reference signal, and send the negative reference signal to the controller and the buck module b81 connected with the second voltage conversion module b83.

The first input terminal of the buck module b81 is connected with the second voltage conversion module b83, and the second input terminal of the buck module b81 is grounded. The buck module b81 is configured to output a negative power supply signal based on the negative reference signal generated by the second voltage conversion module b83, and output the negative power supply signal to the controller connected with the buck module b81. The negative power supply signal and the negative reference signal are used to be provided to the controller to generate a driving signal to drive a lamp area to work. The buck module b81 may be implemented by some buck circuits, e.g., a DC-DC converter such as Buck circuit, or may be implemented by a Low Dropout Regulator (LDO for short).

Figure 31:
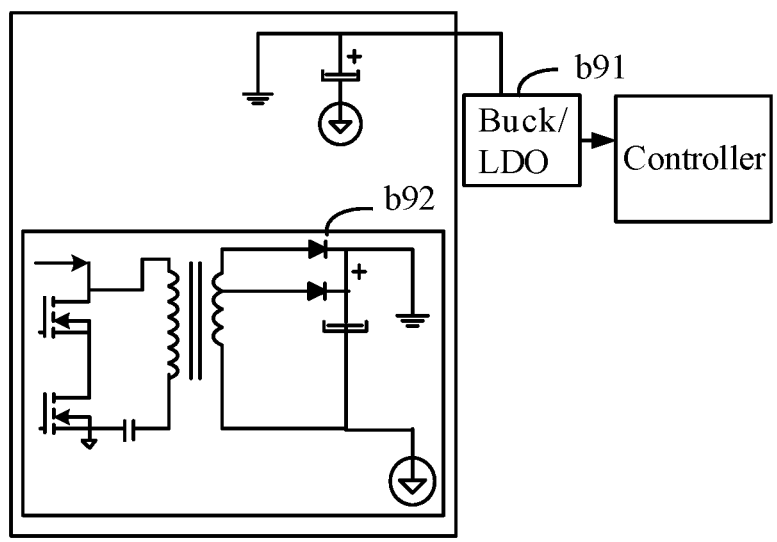
FIG. 31 is a structural schematic diagram of a fifth power source according to an embodiment of the disclosure.

In some embodiments, in order to output the negative power supply signal and the negative reference signal to the controller, an embodiment of the disclosure provide a structure of a fifth power source. FIG. 31 is a structural schematic diagram of a fifth power source according to an embodiment of the disclosure. As shown in FIG. 31, the power source structure of the disclosure can apply to the second power source in FIG. 23. Here, the second power source includes: a buck module b91 and a third voltage conversion module b92.

The third voltage conversion module b92 is configured to receive a power supply signal, obtain a negative reference signal after performing voltage conversion on the power supply signal, and provide the negative reference signal to the buck module b91 connected with the third voltage conversion module b92.

The first input terminal of the buck module b91 is connected with the third voltage conversion module b92, and the second input terminal of the buck module is grounded. The buck module b91 is configured to output a negative power supply signal to the controller connected with the output terminal of the third voltage conversion module b92 based on the negative reference signal generated by the third voltage conversion module b92. The negative power supply signal and the negative reference signal are used to be provided to the controller to generate a driving signal to drive a lamp area to work. The buck module b91 may be implemented by some buck circuits, e.g., a DC-DC converter such as Buck circuit, or may be implemented by a Low Dropout Regulator (LDO for short). In the above-mentioned embodiments shown in FIGS. 30 and 31, another power supply method of the controller in the negative-voltage driving mode is provided, that is, the buck circuit or low dropout regulator is used to supply power to the controller. And, based on this power supply method, the power sources in the display apparatus have two different circuit connection approaches as shown in FIGS. 30 and 31. Compared with the power supply method by adding the coil winding, this power supply method is suitable for a scenario where the negative reference voltage is set low enough, and the buck circuit or low dropout regulator can be directly used for buck operation to obtain the negative power supply signal. Moreover, when it is inconvenient to add a winding module, it is also easier to implement the apparatus provided in this embodiment.

In some embodiments, the controller of the display apparatus includes a mainboard, a microprocessor, and a plurality of constant current drive modules (e.g., a plurality of integrated constant current chips (IC chips)). The microprocessor module is connected with the mainboard and the plurality of constant current drive modules respectively, and configured to parse a control signal transmitted from the mainboard and send the parsed control signal to the plurality of constant current drive modules, and the microprocessor module is also connected with any one power source of a plurality of power sources so that the any one power source supplies power to the microprocessor module. The plurality of constant current drive modules are connected with their corresponding power sources, and the power sources provide the constant current drive modules with negative reference signals and negative power supply signals based on the negative reference signals; and the constant current drive modules are also connected with the negative terminals of the corresponding lamp areas, and configured to provide driving signals to their corresponding lamp areas. The plurality of constant current drive modules are connected with a plurality of lamp areas in a one-to-one correspondence. That is, the constant current drive modules receive the negative reference signals and the negative power supply signals, and provide driving signals to the corresponding lamp areas according to the control signal parsed by the microprocessor, the negative reference signals and the negative power supply signals. Moreover, in the negative-voltage driving mode, the reference ground of the mainboard is the earth, while the reference ground of the constant current drive module in the light-emitting drive module is the negative reference signal generated by its corresponding power source, so an isolation device needs to be provided to enable the signal between the mainboard and the light-emitting drive module to transmit normally.

Figure 32:
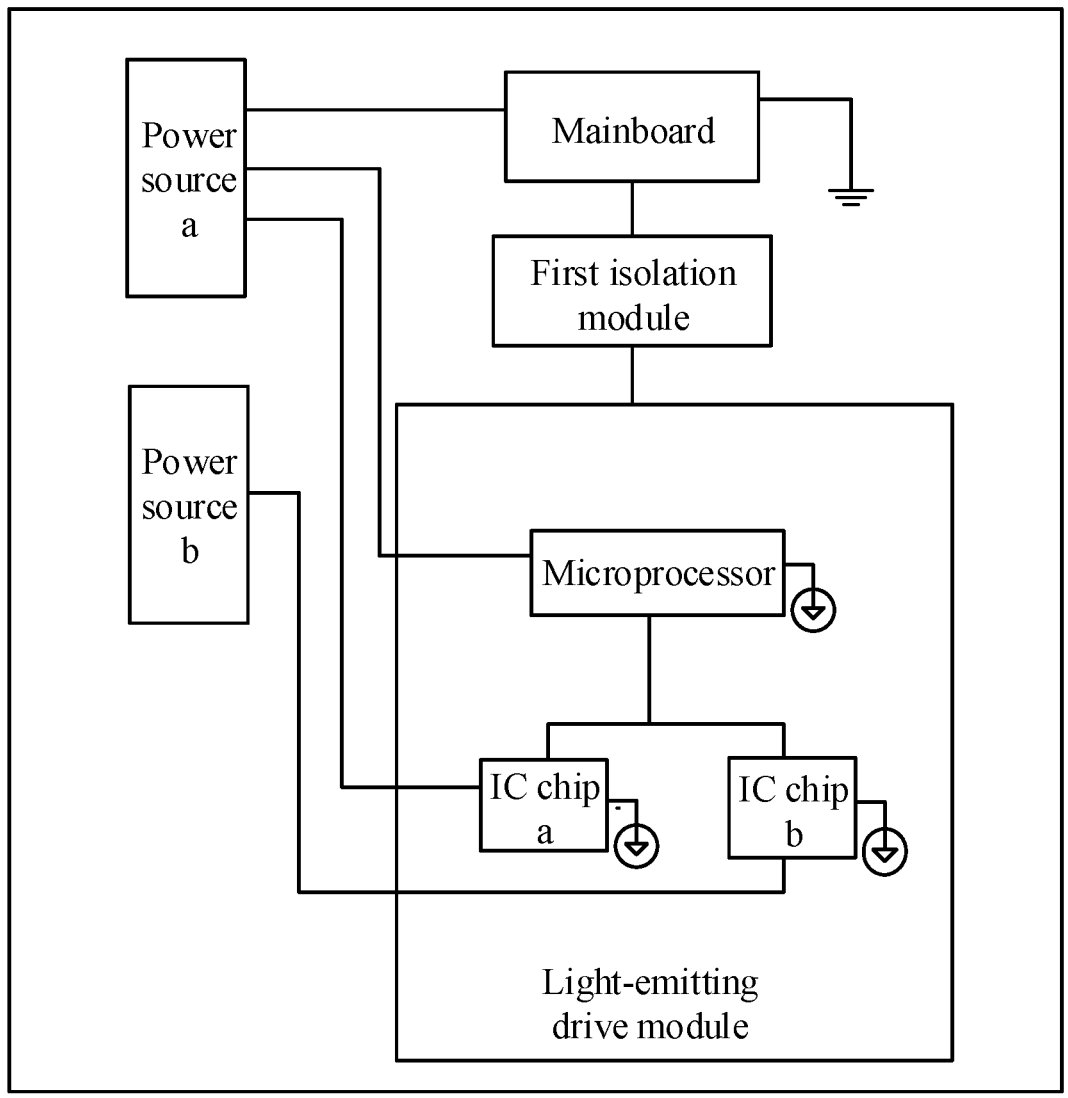
FIG. 32 is a schematic diagram of an isolation structure in the negative-voltage driving mode according to an embodiment of the disclosure.

FIG. 32 is a 1 schematic diagram of an isolation structure in the negative-voltage driving mode according to an embodiment of the disclosure (taking two power sources (power source a and power source b) as an example, where the power source a is the first power source and the power source b is the second power source). When the reference ground of the microprocessor is a negative reference signal generated by the power source, since the reference ground of the mainboard is the earth at this time, it is necessary to set a first isolation module between the mainboard and the light-emitting drive module, that is, the mainboard is connected with the microprocessor in the light-emitting drive module through the first isolation module. The first isolation module is configured to perform level conversion based on a control signal generated by the mainboard, and send the obtained control signal to the microprocessor for analysis, ensuring that signals between the mainboard and the microprocessor can be transmitted normally, and avoiding the interference among the signals and the failure of normal transmissions due to different reference grounds between the mainboard and the microprocessor.

In an example, in the first isolation module, for high-frequency signals (such as clock signals, synchronization signals, etc.), a capacitive isolation device or magnetic isolation device may be used to isolate two reference grounds; and for low-frequency signals (such as chip select signals), the first isolation module may be realized directly through a non-isolated level conversion circuit. During connection, the output signal of the mainboard is connected with input terminals of an isolation device and the level conversion circuit in the first isolation module respectively, and the output terminals of the isolation device and the level conversion circuit in the first isolation module are connected with the microprocessor module. In addition, the IC chip a is connected with the negative terminal of the lamp area a, the IC chip b is connected with the negative terminal of the lamp area b, and the positive terminals of the lamp area a and lamp area b are both grounded. The connections of the lamp area a and the lamp area b is not shown in FIG. 32.

Furthermore, in FIG. 32, when the negative reference voltages generated by the power source a and the power source b are different, that is, the negative reference voltage provided by the power source a to the microprocessor and the IC chip a is the same reference ground, but the negative reference voltage provided by the power source b to the IC chip b is another reference ground, the reference grounds of the two negative reference signals are different, then a first isolation module further needs to be configured between the microprocessor and the IC chip b, which is not shown in FIG. 32.

Figure 33:
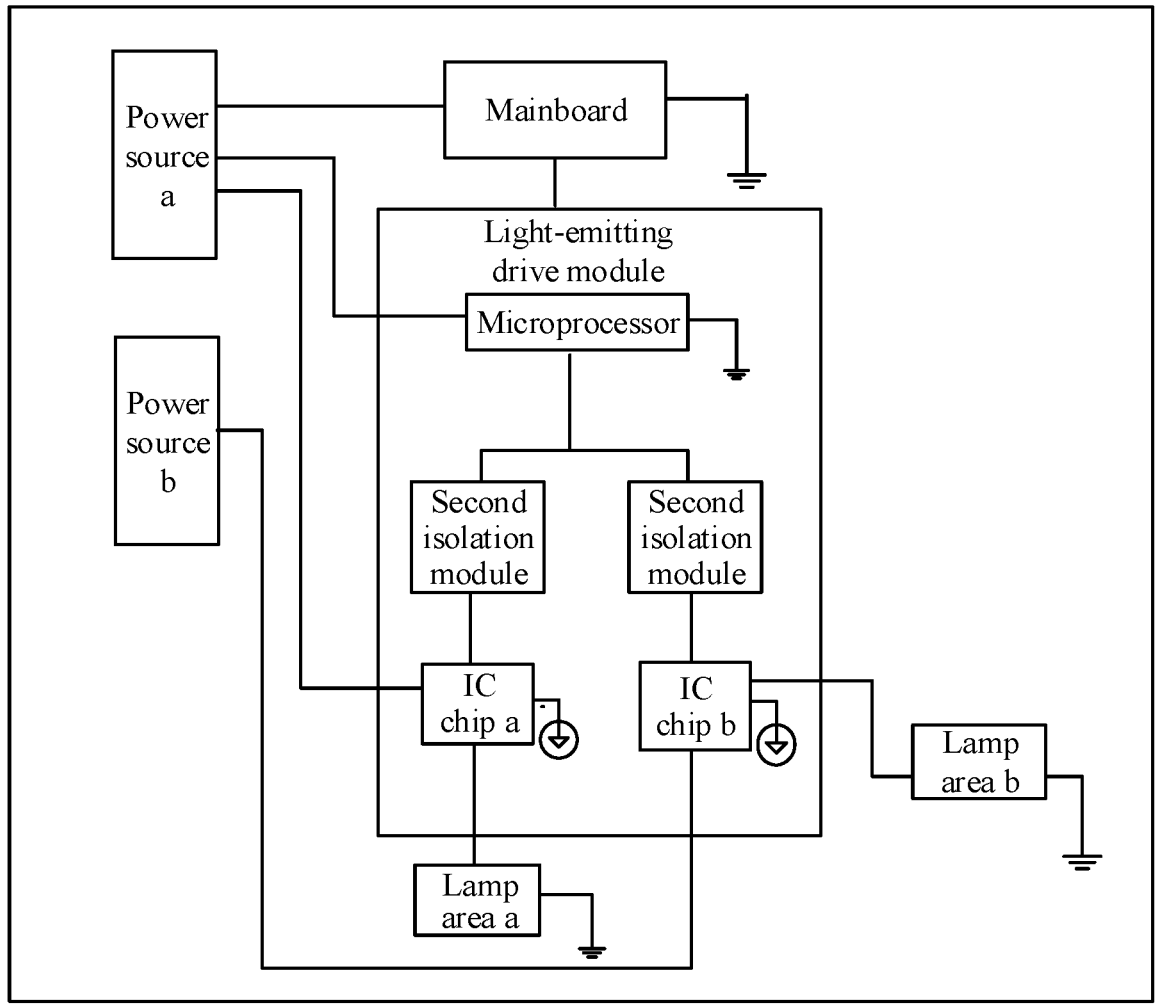
FIG. 33 is a schematic diagram of another isolation structure in the negative-voltage driving mode according to an embodiment of the disclosure.

In some embodiments, FIG. 33 is a schematic diagram of another isolation structure in the negative-voltage driving mode according to an embodiment of the disclosure (taking two power sources as an example, the two power sources are respectively power source a and power source b, which correspond to the lamp area a and the lamp area b respectively). Here, the microprocessor is grounded and configured to parse a control signal generated by the mainboard.

When the reference ground of the microprocessor is the same as that of the mainboard, since the reference grounds between the microprocessor and two constant current drive modules in the figure are different in this case, two second isolation modules are set in this case. The second isolation modules are configured to perform level conversion on the control signal parsed by the microprocessor, and send the converted control signal to the corresponding constant current drive modules, and the second isolation modules and the constant current drive modules are in one-to-one correspondence. The constant current drive modules receive the negative reference signals and the negative power supply signals, and provide driving signals to the corresponding lamp areas according to the converted control signal, the negative reference signals and the negative power supply signals.

The input terminals of two second isolation modules may be connected with the microprocessor, and the output terminals of two second isolation modules are respectively connected with the input terminals of the corresponding constant current drive modules (that is, respectively connected with the IC chip a and IC chip b). The two second isolation modules perform level conversion on the signal parsed by the microprocessor, and then send the signal after level conversion to the corresponding constant current drive modules. And in FIG. 33, the power source a and the power source b provide the IC chip a and the IC chip b respectively with respective negative reference signals and negative power supply signals based on the respective negative reference signals. In each second isolation module, for high-frequency signals (such as clock signals, synchronization signals, etc.), a capacitive isolation device or magnetic isolation device may be used to isolate two reference grounds; and for low-frequency signals (such as chip select signals), the second isolation module may be realized directly through a non-isolated level conversion circuit.

The apparatuses shown in FIG. 32 and FIG. 33 are respectively structural schematic diagrams of two different isolation schemes in the negative-voltage driving mode according to the disclosure. Through these two different isolation schemes, it can be ensured that the signal transmission can be performed between different reference grounds, avoiding the electromagnetic interference of signals due to different reference grounds.

In some embodiments, the above display apparatus further includes a plurality of switches, and there is a one-to-one correspondence between the power sources and the switches. And a plurality of power sources may also be connected through switches. Here, one connection method is: the power source that supplies power to the mainboard is taken as the main power source, the remaining power sources may be connected with a filter module in the main power source through their corresponding switches, and the switches may be controlled by a switch indication signal, and the switch indication signal is sent from the mainboard.

Figure 34:
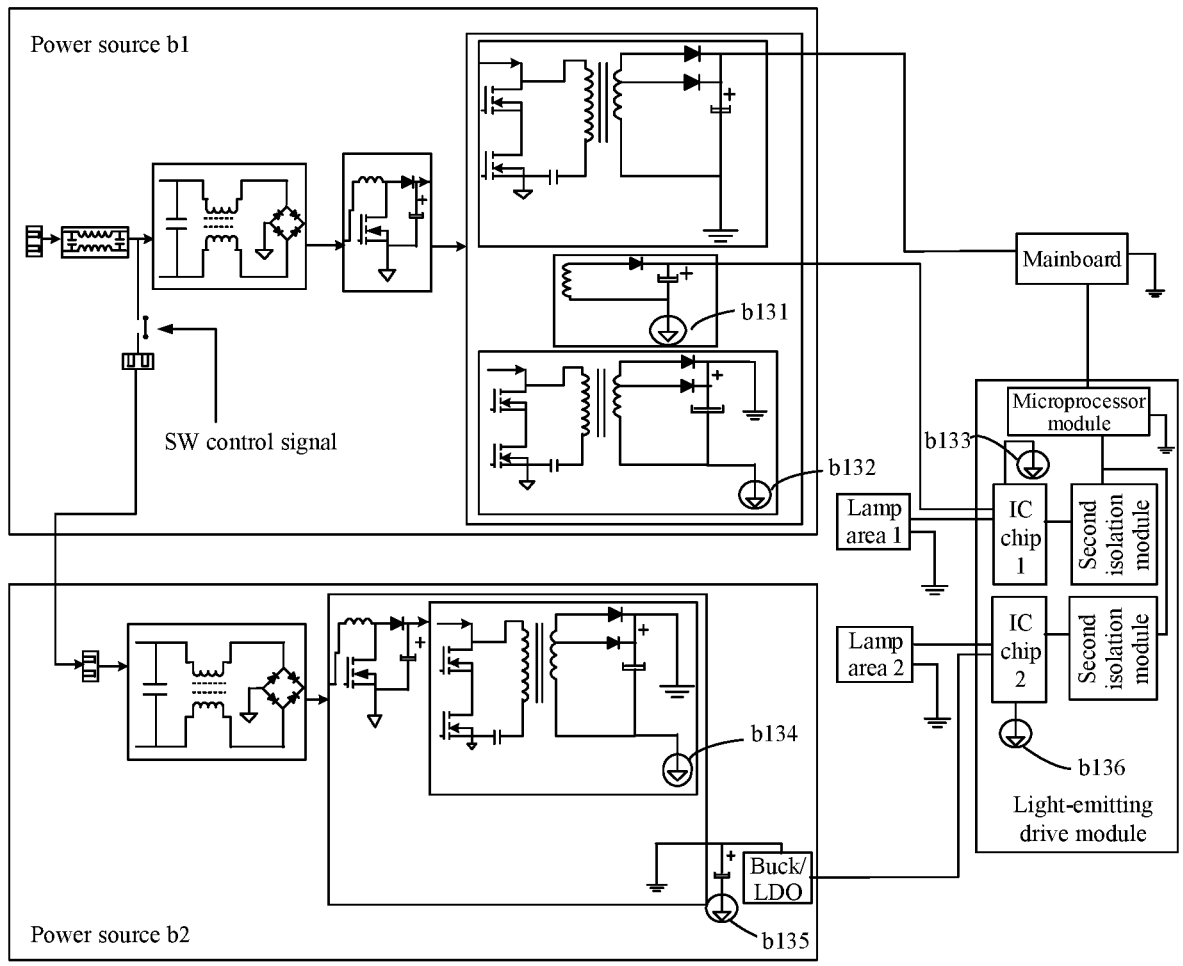
FIG. 34 is a schematic circuit diagram of a negative-voltage-driven backlight module under the control of a plurality of power sources according to an embodiment of the disclosure.

FIG. 34 is a schematic circuit diagram of a negative-voltage-driven backlight module based on control of a plurality of power sources according to an embodiment of the disclosure. In FIG. 34, taking two power sources as an example, the power source b1 provides a positive power supply signal to the mainboard. After a receiving module of the power source b2 is connected with a filter module of the power source b1 through a switching device, the switching device is controlled by the SW control signal to be turned on or off. The SW control signal is sent from the mainboard.

Furthermore, the power supply method adopted by the power source b1 is similar to that shown in FIG. 7 of the disclosure. Each of the power source b1 and the power source b2 is provided with a module for processing the electric AC power, but the power factor correction module and the voltage conversion module are integrated into one chip in FIG. 34. In addition, the power source b1 also provides a negative reference signal and a negative power supply signal for the IC chip, and the power source b2 provides a negative reference signal and a negative power supply signal for the IC chip. Each IC chip is connected with a corresponding second isolation module, and is connected with the microprocessor module through the corresponding second isolation module, so that the microprocessor can parse the control signal sent from the mainboard to the microprocessor and then send the parsed control signal to the IC chip, and then the IC chip sends a drive signal to a corresponding lamp area according to the negative power supply signal and negative reference signal provided by the corresponding power source, to light up the corresponding lamp area.

In addition, in the circuit schematic diagram shown in FIG. 34, the reference grounds of three signals denoted by the reference numeral b131, reference numeral b132 and reference numeral b133 are the same reference ground. The reference grounds denoted by the reference numeral b134, reference numeral b135 and reference numeral b136 are the same reference ground, and the reference grounds of the reference numeral b131 and the reference numeral b134 are different.

In the circuit schematic diagram of the negative-voltage-driven backlight module based on control of a plurality of power sources shown in the above embodiment, different floating designs are performed for different lamp areas and different power sources, that is, different reference grounds are selected, ensuring the one-to-one correspondence between the lamp areas and the power sources. A plurality of power sources can ensure the power consumption requirements of different lamp areas, avoiding the problem of insufficient power due to excessive lamp areas.

Furthermore, in the negative-voltage driving mode, when it is necessary to replace the connection line at the positive terminal of the lamp area by a backplane, the backplane may be selected from a metal plate or an aluminum-plastic plate. In the case of selecting the aluminum-plastic plate as the backplane, since the middle structure of the aluminum-plastic plate is an insulating layer, the problem of middle disconnection is very easy to occur when a light bar in the lamp area is grounded through the backplane, causing the unstable circuit connection in the entire backlight module. Thus, additional rivets or screws may be added to the aluminum-plastic plate in this case, and two sides of the aluminum-plastic plate are connected by the rivets or screws to ensure that the lamp area will not be disconnected when grounded through the backplane.

Figure 35:
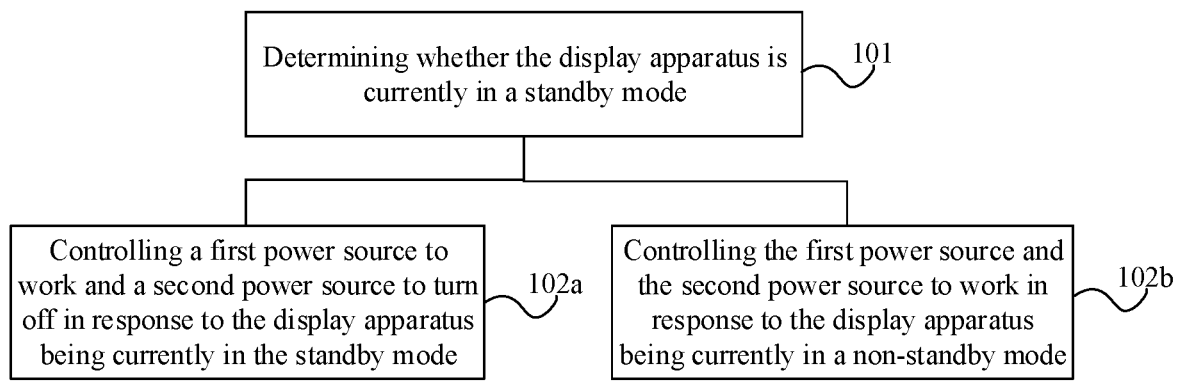
FIG. 35 is a schematic flowchart of a display control method according to the disclosure.

An embodiment of the disclosure further discloses a display control method applied to the above-mentioned display apparatus. FIG. 35 is a schematic flowchart of a display control method according to the disclosure.

As shown in FIG. 35, the method includes: Step 101: determining whether the display apparatus is currently in a standby mode.

Step 102a: controlling a first power source to work and a second power source to turn off in response to the display apparatus being currently in the standby mode.

Step 102b: controlling the first power source and the second power source to work in response to the display apparatus being currently in a non-standby mode.

For example, in the above display apparatus, firstly the first power source connected with the controller may be turned on, so that this power source can provide a positive power supply signal to the mainboard. The controller may receive a user's command for determining whether the display apparatus is currently in the standby mode. For example, the controller may receive the user's operation of the power button on the display apparatus and the operation of the start-up button of the display apparatus. If the display apparatus is not launched after the user presses the power button of the display apparatus, it means that the display apparatus is currently in the standby mode; if the user continues to launch the display apparatus through the button after turning on the power button, it means that the display apparatus is currently in the non-standby mode. After determining the current mode, the controller controls the working states of the power sources in the display apparatus. That is, when the display apparatus is currently in the standby mode, the controller may control the second power source to turn off while the first power source continues to work; when the display apparatus is currently in the non-standby mode, the controller may control the first power source and the second power source to work simultaneously.

For example, each power source may be configured with a switch device, and the switch device may be configured to receive a switch control signal sent from the controller to control the power source to start or stop working. In this embodiment, the controller controls turning-on/off of the power sources in the display apparatus in the standby and non-standby modes, which can reduce the power consumption of the display apparatus and the loss of the display apparatus, and prolong the service life of the display apparatus.

In some embodiments, negative power supply signals and negative reference signals provided by the plurality of power sources also match powers of light-emitting elements in corresponding lamp areas; that is, before step 101, there is also a need to divide all light-emitting elements of the backlight module according to a rule that light-emitting elements with same power belong to a same lamp area, to obtain a plurality of lamp areas.

It should be understood that the disclosure is not limited to the precise structures which have been described above and shown in the drawings, and can be modified and changed without departing from the scope of the disclosure. The scope of the disclosure is only limited by the appended claims.

What is claimed is:

1. A display apparatus, comprising:
a display screen configured to display an image;
at least one Light Emitting Diode (LED) light bar configured to provide light to the display screen; and
a power supply circuit configured to supply power to the display apparatus;
wherein the power supply circuit comprises a resonant converter (LLC) primary winding, a first LLC secondary winding and a second LLC secondary winding, wherein the first LLC secondary winding is configured to convert a voltage of the LLC primary winding into a first voltage, the second LLC secondary winding is configured to convert the voltage of the LLC primary winding into a second voltage; and
the power supply circuit is configured to adjust the first voltage output from the first LLC secondary winding into a third voltage, and supply power to the at least one LED light bar through a sum of the third voltage and the second voltage.

2. The display apparatus according to claim 1, wherein the at least one LED light bar comprises a plurality of LED light bars; and the power supply circuit further comprises: at least one voltage adjustment module and at least one voltage drive module;
an output terminal of the second LLC secondary winding is coupled with an input terminal of the first LLC secondary winding, the input terminal and an output terminal of the first LLC secondary winding are respectively coupled with the at least one voltage adjustment module, and the at least one voltage adjustment module is coupled with the at least one voltage drive module;
the first LLC secondary winding is configured to output the first voltage, and the second LLC secondary winding is configured to output the second voltage;
the at least one voltage adjustment module is configured to adjust the first voltage into the third voltage, and send the sum of the third voltage and the second voltage to the at least one voltage drive module;
the at least one voltage drive module is configured to supply power to the plurality of LED light bars respectively according to the sum of the third voltage and the second voltage.

3. The display apparatus according to claim 2, wherein the at least one voltage drive module is further configured to send a feedback signal to the at least one voltage adjustment module according to currents of the plurality of LED light bars;
the at least one voltage adjustment module is further configured to adjust the first voltage into the third voltage according to the feedback signal.

4. The display apparatus according to claim 3, wherein the power supply circuit further comprises:
an optocoupler, coupled with the at least one voltage drive module and the at least one voltage adjustment module respectively, and configured to perform opto-coupling isolation when the at least one voltage drive module sends the feedback signal to the at least one voltage adjustment module.

5. The display apparatus according to claim 1, wherein the at least one LED light bar comprises a plurality of LED light bars; and the power supply circuit further includes: at least one voltage adjustment module and at least one voltage drive module;
an output terminal of the first LLC secondary winding is coupled with an input terminal of the second LLC secondary winding through the at least one voltage adjustment module, and an output terminal of the second LLC secondary winding is coupled with the at least one voltage drive module;
the first LLC secondary winding is configured to output the first voltage, and the second LLC secondary winding is configured to output the second voltage;
the at least one voltage adjustment module is configured to adjust the first voltage into the third voltage and send the third voltage to the second LLC secondary winding, and the second LLC secondary winding is configured to send the sum of the third voltage and the second voltage to the voltage drive module;

the at least one voltage drive module is configured to supply power to the plurality of LED light bars respectively according to the sum of the third voltage and the second voltage.

6. The display apparatus according to claim 5, wherein the first voltage output from the first LLC secondary winding is less than the second voltage output from the second LLC secondary winding.

7. The display apparatus according to claim 1, wherein the power supply circuit further comprises: a plurality of voltage adjustment modules; and a first LED light bar among the at least one LED light bar is coupled with a first voltage adjustment module among the plurality of voltage adjustment modules;

an output terminal of the second LLC secondary winding is coupled with an input terminal of the first LLC secondary winding, an output terminal of the first LLC secondary winding is coupled with an input terminal of the first LED light bar among the at least one LED light bar respectively, an output terminal of the first LED light bar is coupled with an input terminal of the first voltage adjustment module, and an output terminal of the first voltage adjustment module is coupled with the input terminal of the first LLC secondary winding;

the first voltage adjustment module among the plurality of voltage adjustment modules is configured to adjust the first voltage into a third voltage, and supply power to a LED light bar coupled with the first voltage adjustment module according to a sum of the third voltage and the second voltage.

8. The display apparatus according to claim 7, wherein the first voltage output from the first LLC secondary winding is less than the second voltage output from the second LLC secondary winding.

9. The display apparatus according to claim 1, wherein the power supply circuit further comprises: a plurality of voltage adjustment modules; and the at least one LED light bar is respectively coupled with the second LLC secondary winding and a voltage adjustment module of the voltage adjustment modules;

for each of the at least one LED light bar, an output terminal of the first LLC secondary winding is coupled with an output terminal of the voltage adjustment module, an input terminal of the second LLC secondary winding is coupled with an input terminal of the voltage adjustment module, and an output terminal of the second LLC secondary winding is coupled with an input terminal of the LED light bar;

a first voltage adjustment module among the plurality of voltage adjustment modules is configured to adjust the first voltage into a third voltage, and supply power to a LED light bar coupled with the first voltage adjustment module according to a sum of the third voltage and the second voltage.

10. The display apparatus according to claim 1, wherein an output voltage of the first LLC secondary winding is configured to supply power to a mainboard of the display apparatus.

11. The display apparatus according to claim 1, wherein the first LLC secondary winding and the second LLC secondary winding are secondary windings of an LLC module in the power supply circuit; or the first LLC secondary winding and the second LLC secondary winding are secondary windings of a flyback voltage conversion module in the power supply circuit.

12. The display apparatus according to claim 1, further comprising a third LLC secondary winding, wherein the third LLC secondary winding is configured to output a fourth voltage to supply power to one or more loads of the display apparatus except the at least one LED light bar;

wherein the first voltage falls within a range from 0 to the fourth voltage, the third LLC secondary winding is multiplexed as the first LLC secondary winding.

13. The display apparatus according to claim 2, wherein the at least one voltage adjustment module comprises a BUCK circuit.

14. The display apparatus according to claim 2, wherein the at least one voltage adjustment module comprises a BOOST circuit.

* * * * *